(12) United States Patent
Delvaux

(10) Patent No.: US 6,775,305 B1
(45) Date of Patent: Aug. 10, 2004

(54) SYSTEM AND METHOD FOR COMBINING MULTIPLE PHYSICAL LAYER TRANSPORT LINKS

(75) Inventor: Marc Delvaux, Eatontown, NJ (US)

(73) Assignee: Globespanvirata, Inc., Red Bank, NJ (US)

( * ) Notice: Subject to any disclaimer, the term of this patent is extended or adjusted under 35 U.S.C. 154(b) by 784 days.

(21) Appl. No.: 09/691,933

(22) Filed: Oct. 19, 2000

Related U.S. Application Data

(60) Provisional application No. 60/160,788, filed on Oct. 21, 1999.

(51) Int. Cl.[7] ................................................. H04J 3/04
(52) U.S. Cl. ........................ 370/535; 370/536; 370/539; 370/541
(58) Field of Search .................................. 370/394, 535, 370/537, 536, 540, 474, 542, 510, 518, 503, 538, 539, 541, 543, 544, 545; 375/260, 257

(56) References Cited

U.S. PATENT DOCUMENTS

| | | | |
|---|---|---|---|
| 5,555,241 A | * | 9/1996 | Lazaridis et al. ............ 370/389 |
| 5,563,877 A | | 10/1996 | Van Tetering et al. ...... 370/58.2 |
| 5,608,733 A | | 3/1997 | Vallee et al. ................. 370/394 |
| 5,617,417 A | * | 4/1997 | Sathe et al. .................. 370/394 |
| 5,875,192 A | * | 2/1999 | Cam et al. ................. 370/395.7 |
| 5,970,067 A | * | 10/1999 | Sathe et al. .................. 370/394 |
| 6,148,010 A | * | 11/2000 | Sutton et al. ................ 370/536 |
| 6,198,749 B1 | * | 3/2001 | Hui et al. ..................... 370/463 |
| 6,577,653 B1 | * | 6/2003 | Rochberger et al. ......... 370/536 |
| 6,625,176 B1 | * | 9/2003 | Amann et al. ............... 370/503 |

OTHER PUBLICATIONS

Web Page, rfc 1717, The PPP Multilink Protocol (MP), www.cis.ohio–state.edu/htbin/rfc/rfc1717.html, pp. 1–19, Oct. 2, 2000.

* cited by examiner

*Primary Examiner*—Wellington Chin
*Assistant Examiner*—Jamel A. Fox
(74) *Attorney, Agent, or Firm*—Thomas, Kayden, Horstemeyer & Risley

(57) ABSTRACT

A multi-channel communication link generates a transport data protocol unit (TPDU) corresponding to each data packet received at a particular interface in a packet switching network. Each TPDU may comprise a data packet in accordance with a standard data transfer protocol and a modified header comprising a sequence number responsive to the relative position of the data packet within a data stream. The multi-channel communication link may inverse multiplex the various TPDUs for transmission across a plurality of asynchronous communication lines. A multi-channel communication link in accordance with the present disclosure may comprise a source first-in first-out (FIFO) buffer, a source line multiplexer/demultiplexer, a plurality of asynchronous communication links, a destination line multiplexer/demultiplexer, and a destination FIFO buffer. The present disclosure also provides a method for transferring data between computing devices via a virtual transport link.

32 Claims, 12 Drawing Sheets

SYSTEM AND METHOD FOR COMBINING MULTIPLE PHYSICAL LAYER TRANSPORT LINKS

CROSS-REFERENCE TO RELATED APPLICATION

The present application claims the benefit of co-pending U.S. provisional patent application, issued Ser. No. 60/160,788, and filed Oct. 21, 1999, which is hereby incorporated by reference in its entirety.

FIELD OF THE INVENTION

The present invention generally relates to high-speed data communications. More specifically, the invention relates to a system and method for combining a plurality of co-located physical layer transport links to form a virtual transport link that reuses standard asynchronous transfer mode (ATM) to physical layer interfaces (at both sides) while maintaining data sequence order.

BACKGROUND OF THE INVENTION

With the advancement of technology, and the need for instantaneous information, the ability to transfer digital information from one computing device to another has become more and more important. Various line bonding techniques have been applied to provide bandwidth on demand, e.g., by applying multiple integrated services digital network (ISDN) connections in parallel and controlling the number of connections as a function of the expected load, to provide a better granularity between the T1 and T3 (or E1 and E3) standard telecommunication rates, and to provide more robust data transport systems by introducing redundancy.

Various line bonding techniques sometimes referred to as inverse multiplexing have been implemented. In bit level multiplexing, incoming data is stripped into individual bit streams. Each stripped bit stream is communicated individually across a physical transport link. At the receiving end of the link, framing is performed to realign the various stripped bit streams received on the various physical transport links into the original data stream. Bit level multiplexing is frequently performed through hardware implementations at the physical layer. As such, bit level multiplexing offers a great deal of flexibility in designing a multi-transport link. In addition, bit level multiplexing at the physical layer has the advantage of reducing data transfer latency when compared to multiplexing methods that operate at a protocol data unit (PDU) level. However, the flexibility of bit level multiplexing solutions requires the integration of hardware to identify, coordinate in time, and possibly error correct the various transmitted bit streams stripped from the original data stream. Bit level multiplexing solutions are difficult to implement when the various physical transport links operate at different bit rates. Still another drawback related to bit level multiplexing solutions is that they do not take advantage of the redundancy provided in the multiple physical transport links, if one link fails, every PDU is lost until an operable line bonding solution is configured. Because bit level multiplexing solutions are hardware solutions both the source and the destination devices must be configured with suitable hardware to strip and transmit a plurality of bit streams near a source computing device and receive and reassemble the transmitted bit streams near the destination computing device. The hardware intensive nature of bit level multiplexing solutions restricts such solutions to bandwidth on demand requests in proprietary intranets or between computing devices that use designated communication links that follow a particular bit sequencing standard to transfer information. As a result, bit level multiplexing solutions are not easily adaptable at the interface between an ATM layer device and a physical layer device.

Multi-link point to point protocol (PPP) is an Internet engineering task force (IETF) request for comments (RFC) communication standard that functions at a data packet level. Multi-link PPP inserts a sequence number to ensure that the virtual link preserves the original data packet sequence order at a destination-computing device. Multi-link PPP is a software solution that provides for the use of multiple simultaneous channels between systems, giving users bandwidth on demand. Multi-link PPP uses a combination of a four byte sequencing header with synchronization rules to split packets among parallel communication paths between systems such that the data packets do not become reordered at the destination device. Because multi-link PPP is a software solution both the source and the destination devices must be configured with a suitable processor and memory to store the necessary program code. This requirement limits multi-link PPP to the application of intersystem communication links as the additional hardware and firmware required to perform a multi-link PPP data transfer at an interface between an ATM layer device and a physical layer device makes such a transfer impractical as multi-link PPP is not directly suitable for ATM transport, even if ATM encapsulation in PPP could be envisaged.

Inverse multiplexing for ATM is an ATM forum standard defined for communication systems carrying ATM cells. The standard is quite complex and only applicable when the various transport links used in a transport bundle have nominally the same bit rate (e.g., all transport links are T1 links). Inverse multiplexing for ATM (IMA) is typically implemented by a mixture of hardware and software. IMA is complex both in defining the corresponding framing, typically performed in hardware, and in defining the control mechanism to establish and control bundles, usually performed in software.

In an IMA communication system, cell traffic is transported using a time division multiplexing technique over several channels (typically T1 or E1 data links). In a cell based IMA system, these ATM cells or payload cells are sent on each channel in a round-robin fashion using an identical period for each of the transport links. The IMA communication system relies on synchronized system clocks to inverse multiplex and reassembles data packets in the correct order.

For transmission of data beyond a local area, communication is typically achieved by transmitting data from source to destination computing devices through a network of intermediate switching nodes. These nodes are not concerned with the content of the data. Rather, their purpose is to provide a switching facility that will transport the data from node to node until the data reaches its target destination (e.g., a computing device). FIG. 1 illustrates a prior art communication system 1 that uses a plurality of ATM switching nodes to transfer data to and from a plurality of computing devices. More specifically, the communication system 1 comprises computing devices 15a–15d, herein labeled, "A, B, C, D" in communication with each other via communication links 11 and an ATM switching network 10. As illustrated in FIG. 1, the ATM switching network 10 comprises a first ATM node 13a in communication with a second ATM node 13b via a plurality of links 16. As indicated above, these links 16 may comprise a plurality of standard T1, T3, E1, E3, or other data communication links with the same bit rate. The first ATM node 13a may comprise a first ATM switch 12a and a first ATM inverse multiplexer (AIM) 14a. The second ATM node 13b may comprise a second AIM 14b coupled to a second ATM switch 12b. As also illustrated in FIG. 1, the second ATM switch 12b of the second ATM node 13b may be in communication with computing devices 15c, 15d, "C" and "D", via designated data communication links 11.

In a well known manner, a cell stream originating at computing device 15b (B) and having cell headers that designate computing device 15d (D) as their destination, may be transmitted along communication link 11 to the first ATM switch 12a within the first ATM node 13a of the ATM switching network 10. The first ATM switch 12a uses information in the cell header of each of the cells comprising the cell stream to identify an appropriate destination ATM switch 12b. Those skilled in the art will appreciate that an ATM switch 12a may be in communication with a plurality of remotely located ATM switches 12 via a plurality of designated AIM devices 14 and links 16. For simplicity of illustration and description, only two ATM switches 12a, 12b are illustrated in the ATM switching network 10 of FIG. 1. In the exemplary communication system illustrated in FIG. 1, the source ATM node 13a is communicatively coupled with the destination ATM node 13b via a plurality of links 16. Those skilled in the art will appreciate that ATM cells may traverse a plurality of interconnected ATM nodes 13 via links 16 on their way from a source computing device 15b to a destination computing device 15d. It will be further appreciated that individual ATM cells within the ATM cell stream may travel over significantly different physical paths within the ATM switching network 10.

Having identified the appropriate destination ATM node 13b in order to distribute the cells of the cell stream to computing device 15d (D), the first ATM switch 12a makes the various individual cells available to the first AIM 14a. The first AIM 14a applies each of the cells in a round-robin fashion to each of the available links 16 that connect the first ATM node 13a to the second ATM node 13b. The second AIM 14b within the second ATM node 13b receives each of the individual cells from each of the various links 16, reassembles the cell stream such that cell sequence integrity is preserved (i.e., the cell stream is reconstructed at the receiving end using the same round-robin sequence that was used to strip and transmit the various separate cells streams over the various links 16) and forwards the reassembled ATM cell stream to the second ATM switch 12b. Having been properly transferred and reassembled from a first or source ATM node 13a to a second or destination ATM node 13b within the ATM switching network 10, the individual cells within the cell stream are then transmitted from the second ATM switch 12b via the communication link 11 to the computing device 15d (D). It will be appreciated that the communication system 1 may be used to transmit video, voice, and text data between each of the interconnected computing devices 15. It will be further appreciated that the communication system 1 may comprise bi-directional communication links 11 and bi-directional ATM nodes 13 to permit simultaneous video, voice, and text data transfers to and from each of the computing devices coupled to the ATM switching network 10.

A digital subscriber line (DSL) communication system is but one example of a number of communication systems that may simultaneously transmit and receive digital data between two locations. Since a DSL communication system is capable of both transmitting and receiving digital data, a DSL communication system may serve as the communication link 11 between an ATM node 13 in an ATM switching network 10 and a computing device 15. In addition, a DSL communication system may serve as a portion of multi-channel communication link 16. In a DSL communication system, data is transmitted from a central office (CO) of the public switched telephone network (PSTN) to a customer premise (CP) via a transmission line, such as a two-wire twisted pair, and is transmitted from the CP to the CO as well, either simultaneously or in different communication sessions. The same transmission line might be utilized for data transfers by both sites or the transmission to and from the CO might occur on two separate lines.

Asymmetric DSL (ADSL) is an important variation of the basic DSL. ADSL gets its name from its inherent asymmetry between the various data rates. The upstream data rate (i.e., the data from the CP to the CO) is a factor of 10 smaller than the associated downstream data rate (i.e., the data from the CO to the CP). The asymmetry of ADSL suits transmission control protocol/Internet protocol (TCP/IP) data traffic quite well as it matches the expected upstream and downstream data rates associated with Internet technologies, such as server/client applications like web browsing and access in general. This is less true for LAN-LAN interconnection cases where IP is also used but where the data transmissions between the various computing devices are more uniform.

ADSL permits simultaneous plain old telephone system (POTS) operation along the same twisted-pair telephone line, thereby allowing DSL service providers easy access to potential customers already connected to the PSTN. In addition to the asymmetry of the upstream and downstream data paths, ADSL uses rate adaptation techniques to select an optimum rate based on individual twisted-pair telephone line conditions.

With ADSL transceivers, the maximum usable data rate may be determined by a number of factors. A first factor, the transceiver technology, may comprise the digital encoding and modulation scheme of the underlying ADSL communications standard, as well as, amplifier efficiency, and noise immunity associated with the hardware used to realize the DSL transceiver. A second factor may comprise the quality and distance of the twisted-pair telephone line comprising a local telephone service subscriber loop used to provide a data transmission medium between an ADSL transceiver in a CO and an associated CP-ADSL transceiver. A third factor may comprise the relative strength of local radio-frequency transmissions that may interfere with the ADSL frequency range. With rate adaptive DSL communications systems, such as ADSL, slower data rates can be traded in exchange for increased distances between COs and remotely located CPs.

In order to achieve higher data rates with a fixed distance or with a given non-rate adaptive DSL transceiver technology, two or more DSL lines may be combined. By way of example, high-speed DSL (HDSL) technology uses two pairs of twisted copper wire, HDSL transceivers, multiplexers and demultiplexers at each end of a communication link to provide T1 capacity service over two pairs of twisted copper conductors commonly used in local subscriber loops within the PSTN. The European version of HDSL binds three pairs of twisted copper conductors and their related transceivers, multiplexers, and demultiplexers to provide E1 capacity service.

In general, DSL implementations are configured such that each DSL transceiver at a CP has its own dedicated interface with associated customer premise equipment (CPE). In order to combine two or more DSLs at a CP an additional multiplexing unit is required. The additional multiplexing unit can be realized in a programmable microprocessor or with a dedicated application specific integrated circuit (ASIC). In either case, the number of components and the footprint of the system increase without a corresponding flexibility. HDSL bit multiplexing is strictly limited to predefined values and all links are synchronized using the same clock.

The prior art HDSL link illustrated in FIG. 2 is offered by way of example to highlight the additional interface equipment required as additional transmission media are added to increase the performance of a communications link. In this regard, FIG. 2 illustrates a basic HDSL network link architecture. As illustrated in FIG. 2, a HDSL network link 11 may comprise equipment located within a CO 20, equipment located within a CP 40, and HDSL interface equipment 30 as required within each location to transfer data to and from an ATM switch 13 (FIG. 1). More specifically, the central office 20 may comprise a plurality of trunk line interfaces 21, 23, and 25, herein labeled analog trunk card, digital trunk card, and optical trunk card respectively; a PSTN digital switch 22; and a plurality of HDSL termination units—central office (HTU-C) 24a, 24b, 24c, . . . , and 24x. As illustrated in FIG. 2, each HTU-C 24a, 24b, 24c, . . . , and 24x may be coupled via two twisted pair telephone transmission lines 31a, 31b to a dedicated HDSL termination unit—remote (HTU-R) 44c (one shown for simplicity of illustration). As also illustrated in FIG. 2, the combination of the HTU-C 24c, the two twisted pair telephone transmission lines 31a, 31b, and the HTU-R 44c may comprise the HDSL interface equipment 30. As further illustrated in FIG. 2, the CP 40 may comprise a customer interface 46 and customer premise equipment 48 which may contain one or more computing devices 15 (FIG. 1).

It is significant to note that downstream and upstream data transmissions that are transmitted across the HDSL network link 11 of FIG. 2 must be processed at the HTU-Rs 44 and the HTU-Cs 24 in order to ensure that data transmissions are inverse multiplexed and reconstructed into their original configuration. Each of the HTU-Rs 44 and the HTU-Cs 24 may further comprise a transceiver and a mapper (both not shown). At one end of the HDSL communications network 11, a first mapper may be used to inverse multiplex or distribute a data transmission across multiple transmit media (i.e., the twisted pair telephone transmission lines 31a, 31b). At the opposite or receiving end of the HDSL communications network 11, a second mapper may be used to multiplex or reconstruct the original data transmission. By way of example, a downstream data transmission may be inverse multiplexed such that a portion of the data is transmitted via the HTU-C 24c across a first twisted pair telephone transmission line 31a with the remaining portion of the data transmission sent via a second twisted pair telephone transmission line 31b. After the first and second portions of the data transmission are received and reconstructed by the HTU-R 44c, the first and second portions of the original data stream may be multiplexed before being forwarded to the customer interface 46 and the CPE 48. Often the customer interface 46 is implemented with a router having a port coupled with one or more HTU-Rs 44 and or other network interface devices.

It will be appreciated that the complexity and associated increase in the hardware and or software required to implement a prior art line bonding technique at the interface between ATM layer and physical transport layer devices may be significant factors that may prevent the success of a multi-channel communication link at this level. In light of the expected implementation and operational cost erosion for all data interface technologies, it is highly desirable to identify and implement communication links that exhibit increased performance with minimal added cost and complexity.

Accordingly, there is a need for an improved system and method that can increase the bandwidth of a communication link between two computing devices at the interface between ATM layer devices and various available physical layer transport links while minimizing installation and operational complexity, space requirements, and cost.

SUMMARY OF THE INVENTION

To provide an improved system that overcomes shortcomings noted above, the invention is a system and a method for combining multiple communication links at both sides of an ATM communications network. An improved ATM communications network in accordance with the present invention may achieve an overall higher data transfer rate by combining available communication transport links at the interface between an ATM layer device and a plurality of physical transport layer devices. The multi-channel communication link of the present invention achieves increased performance with a minimal hardware investment at the source and destination ATM network nodes. A multi-channel communication link in accordance with the present invention may comprise a source first-in first-out (FIFO) buffer, a source line multiplexer/demultiplexer, a plurality of communication links, a destination line multiplexer/demultiplexer, and a destination FIFO buffer.

The present invention can also be viewed as a method for transferring data between computing devices on a virtual transport link. In its broadest terms, the method can be described by the following steps: applying a sequence number to each packet to be transported in a time ordered fashion to create a corresponding transport protocol data unit; identifying the next available communication link; transmitting the next available transport protocol data unit on the identified communication link; receiving each transport protocol data unit; identifying the corresponding sequence number for each transport protocol data unit received; resequencing each received transport data unit as required; and releasing each packet to the destination device once all previous packets have been received and resequenced in the correct sequence order. In a variation of the method, a timeout process may be included for transport protocol data unit loss recovery. Using the timeout process, each packet may be sorted as in the broadest method then all cells up to the one generating the timeout may be released in sequence number order once the timeout period has been exceeded.

Other features and advantages of the present invention will become apparent to one skilled in the art upon examination of the following drawings and detailed description. It is intended that all such additional features and advantages be included herein within the scope of the present invention, as defined by the claims.

BRIEF DESCRIPTION OF THE DRAWINGS

The present invention will be more fully understood from the detailed description given below and from the accompanying drawings of the preferred embodiment of the invention, which however, should not be taken to limit the invention to the specific embodiments enumerated, but are for explanation and for better understanding only.

Furthermore, the drawings are not necessarily to scale, emphasis instead being placed upon clearly illustrating the principles of the invention. Finally, like reference numerals in the figures designate corresponding parts throughout the several drawings.

DETAILED DESCRIPTION OF THE PREFERRED EMBODIMENTS

A multi-channel communication link system in accordance with the present invention achieves increased performance by applying a sequence number to each proposed data packet targeted for transport across the communication link. A transport protocol data unit comprising a data packet and a corresponding sequence number that defines the relative position of the individual data packet in a source data packet stream as it traverses an interface between an ATM layer device and a physical layer device may be used in conjunction with a set of predetermined transport link delay differences between the individual physical transport links to reassemble a stream of received transport protocol data units at a physical layer device. The transport protocol data unit and required hardware to implement the improved multi-channel communication link may be implemented at a much lower level than multi-link PPP the best known software technique for transferring data packets across multiple asynchronous communication channels in a network.

Figure 1:
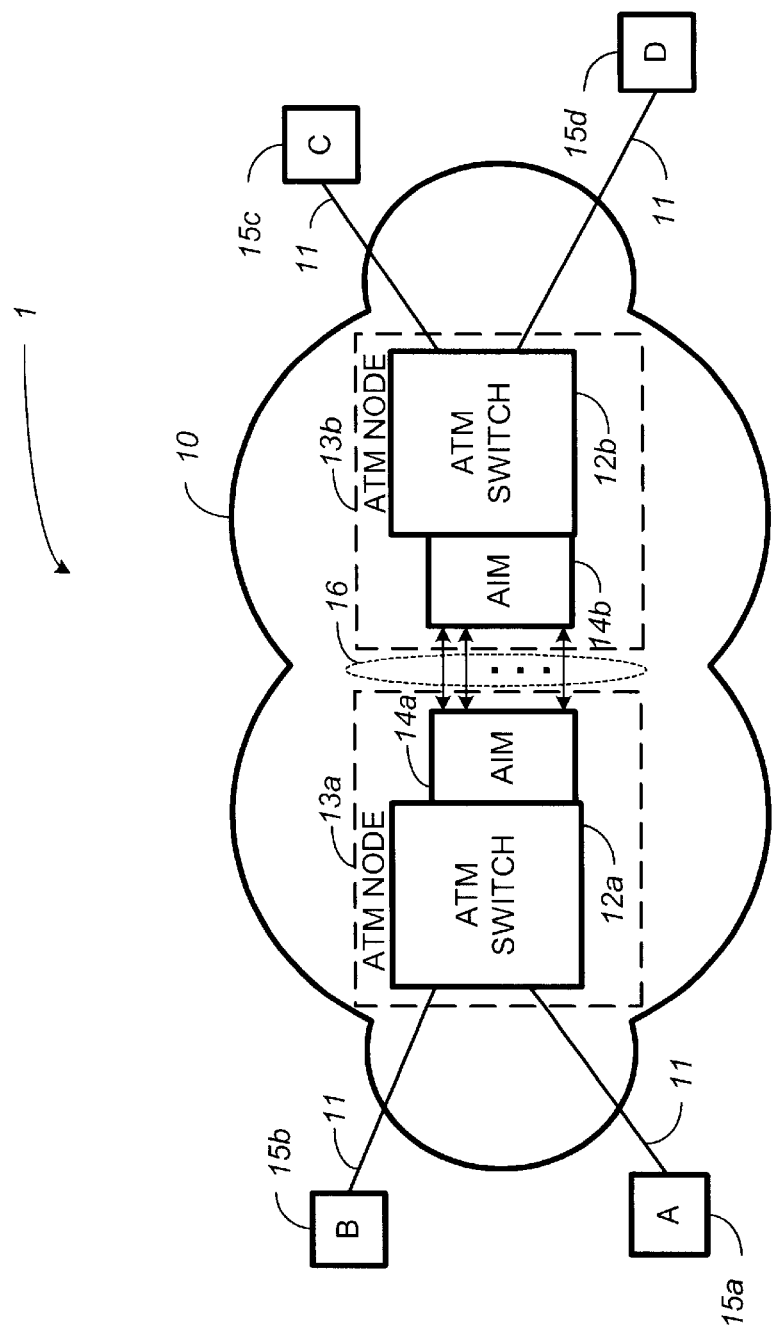
FIG. 1 is a prior art block diagram illustrating a multi-node ATM switching communications system with line bonding.
Figure 2:
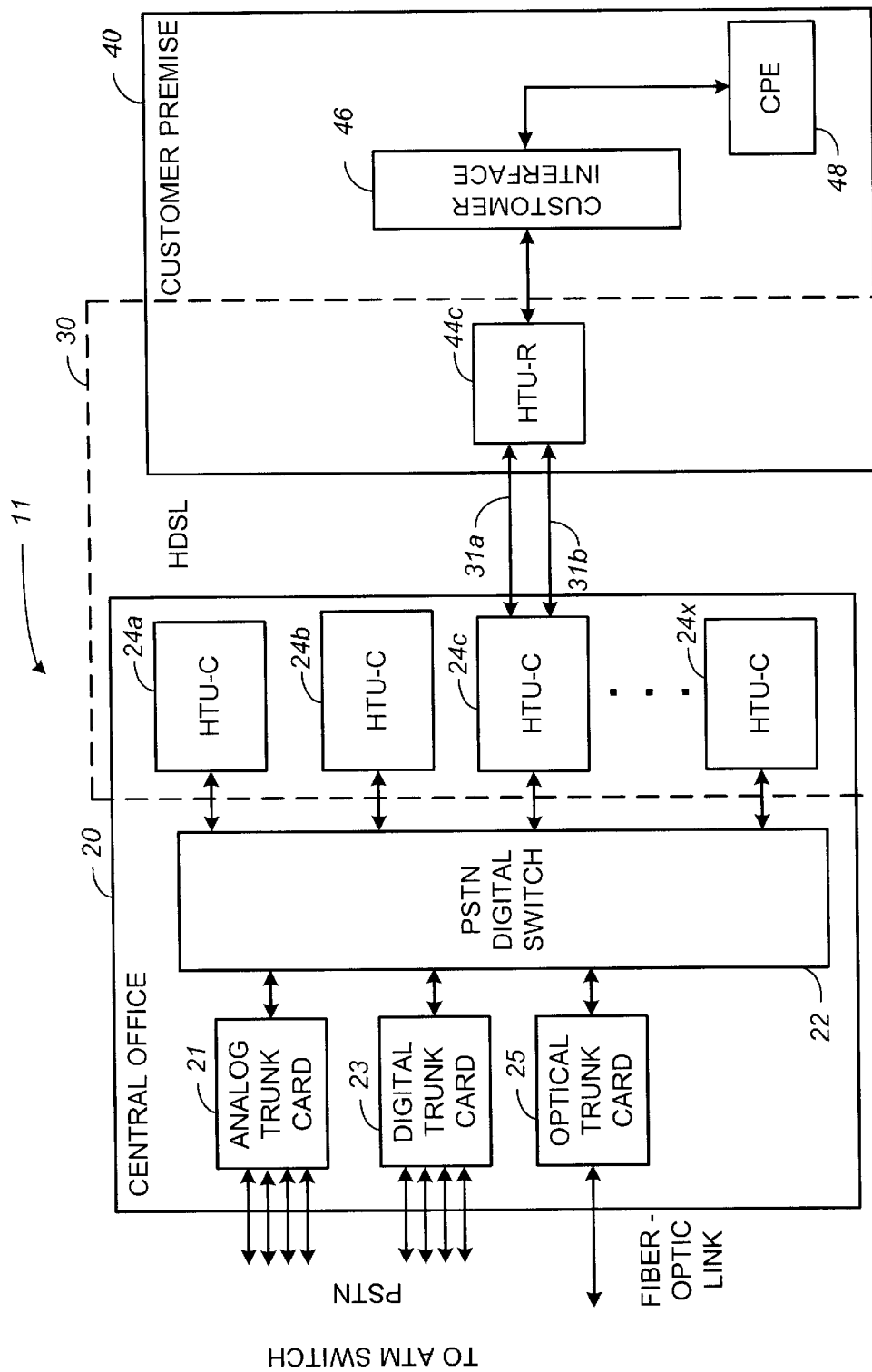
FIG. 2 is a prior art block diagram illustrating a HDSL communication link that may serve as a communications link between an ATM switch and a computing device in the ATM switching communications system of FIG. 1.

The multi-channel communication link in accordance with the present invention may be useful in implementing the "last mile" in an ATM switching network. In other words, the multi-channel link of the present invention may provide a bandwidth on demand version of the communication link 11 between an ATM switching node 13 and a computing device 15 (FIG. 1). In the special example of a multi-channel communication link 11 comprising a plurality of DSLs, the existing DSL integrated circuits at the physical layer may be bundled. As a result, the reuse of existing components necessary to implement a plurality of DSLs between an ATM node 13 and a remotely located computing device 15 simplifies the implementation as only a simple line bonding device needs to be added at the customer site.

It is significant to note that the multi-channel communication link in accordance with the present invention differs from IMA in that the multi-channel communication link of the present invention may be implemented using a plurality of asynchronous links having independent bit rates. Whereas IMA is designed for a plurality of standard synchronous communication links where a destination packet assembler need only apply a round robin technique to resequence the transmitted cells. Adding or removing available asynchronous links from the multi-channel communication link of the present invention is trivially implemented. Especially compared to the IMA methods using a finite state machine. The proposed method doesn't provide for automatic protection switching like IMA but something similar is easily implemented using the far end error information provided by an embedded operations channel (EOC). An EOC is a mechanism that permits the transmission of information between two end points via DSL links at the PHY layer (i.e., without using ATM or any layer 2 protocol). More generally, automatic protection switching may be implemented by any method providing a return path for error indications from the opposite end of a data transmission link. In addition the multi-channel communication link is much less dependent on precise system clocks to synchronize data transfers.

Furthermore, a method for transferring data between computing devices across a virtual transport link in accordance with the present invention provides a uniform and scalable solution for using, programming, and configuring multiple lines in a "line bonding" application. In a preferred implementation, a plurality of ADSL transceivers forming a plurality of ADSLs may form the physical transport layer of the virtual transport link. Before focusing on the system and method of the present invention, an explanation concerning standard data transfers between data processing devices follows.

The Reference Model for Open Systems Interconnection

Figure 3:
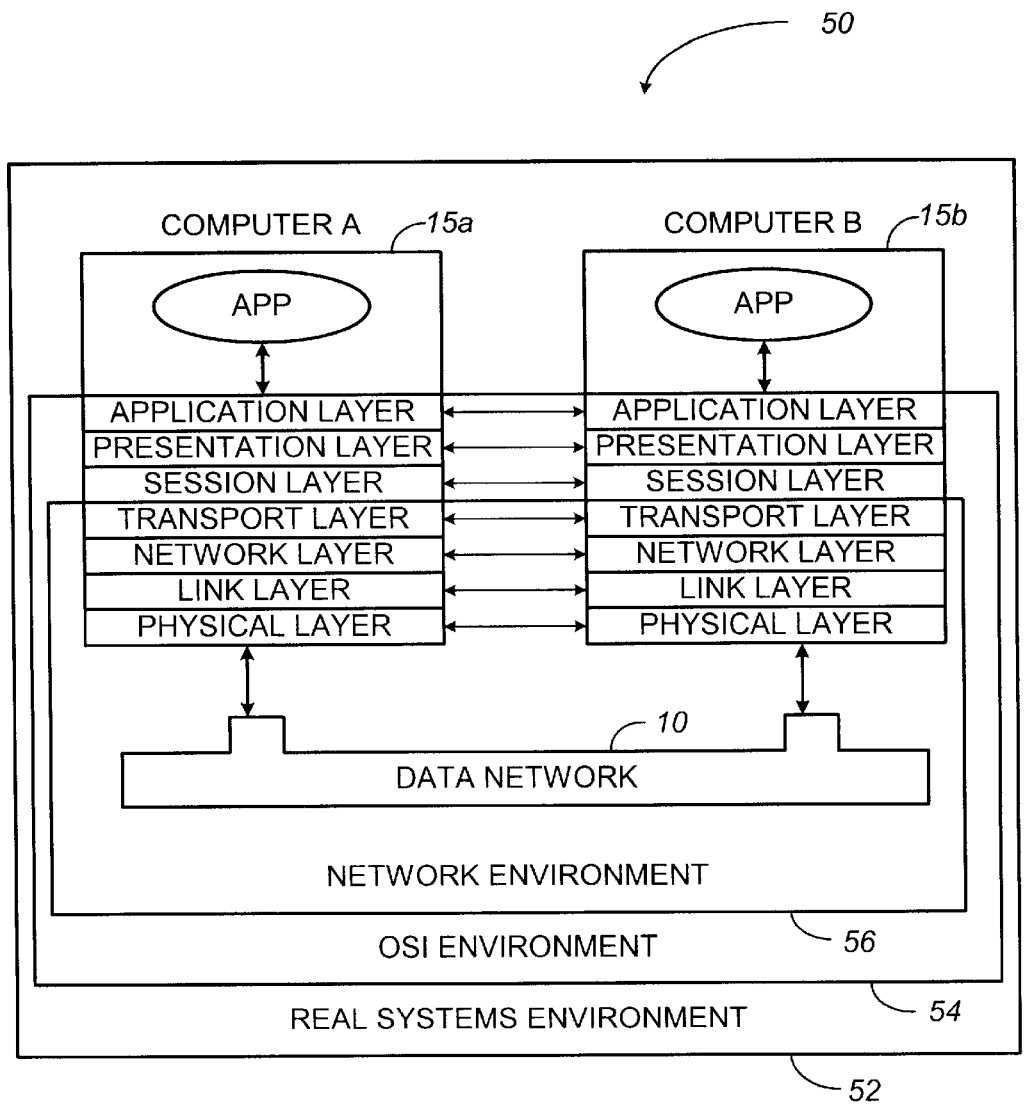
FIG. 3 is a schematic diagram illustrating the operational environments in the International Standards Organization reference model for open systems interconnection (OSI) between computing devices, such as the computing devices interconnected by the multi-node ATM switching communications system of FIG. 1.

FIG. 3 is a diagram illustrating the operational environments in the International Standards Organization (ISO) reference model for open systems interconnection (OSI). As illustrated in the ISO reference model for OSI shown in FIG. 3, a network communication link 50 may be established between a first computer 15a, herein labeled, "computer A" and a second computer 15b, herein labeled, "computer B," when the computers 15a, 15b are coupled to a data network such as the multi-node ATM switching network 10 of FIG. 1. A communication system may comprise a complex configuration of both hardware and software. Early attempts at implementing software for such systems were often based on a single, complex, and unstructured program with many interacting components. The resulting software was difficult to test, troubleshoot, and modify.

To overcome these problems, the ISO adopted a layered approach in creating a reference model for data communications systems. The complex communication system is broken down into multiple layers, each of which performs a well-defined function. Conceptually, the layers can be considered as performing one of two generic functions, either network-dependent functions or application-oriented functions. The functional breakdown defining network functions and application-oriented functions gives rise to three distinct operational environments: the network environment 56, the OSI environment 54, and the real-systems environment 52.

The network environment 56 is concerned with the protocols and standards relating to the different types of underlying data communication networks. The OSI environment 54 encompasses the network environment 56 and adds additional application oriented protocols and standards to allow end user systems (i.e., the computers 15*a*, 15*b*) to communicate with one another. The real-systems environment 52 builds on the OSI environment 54 and is concerned with an individual manufacturer's proprietary software and services developed to perform a particular distributed information processing task.

As further illustrated in FIG. 3, both the network-dependent and the application-oriented components of the OSI model are operative within computers 15*a*, 15*b* and are represented as a number of layers. Each layer performs a well-defined function in the context of the network communication link 50. Each layer operates according to a defined protocol by exchanging messages, both user data and additional control information, with a corresponding peer layer in a remote system (i.e., the computers 15*a*, 15*b*). This concept is illustrated in FIG. 3 by way of the two-headed arrows between each of the respective layers. Each layer has a defined interface between itself and the adjacent layers both above and below. Consequently, the implementation of a particular protocol layer is independent of all other layers.

As shown in FIG. 3, the logical structure of the ISO reference model is made up of seven protocol layers. The three lowest layers, the network layer, the link layer, and the physical layer, are network dependent and are concerned with the protocols associated with the data communication network being used to link the computers 15*a*, 15*b*. In contrast, the three upper layers, the application layer, the presentation layer, and the session layer, are application-oriented and are concerned with the protocols that allow two end-user application processes (computer programs) to interact with each other. The intermediate transport layer, masks the upper level application-oriented layers from the details of the lower network-dependent layers. Essentially, the transport layer builds on services provided by the network-dependent layers to provide the application-oriented layers with a network independent message interchange service.

Figure 4:
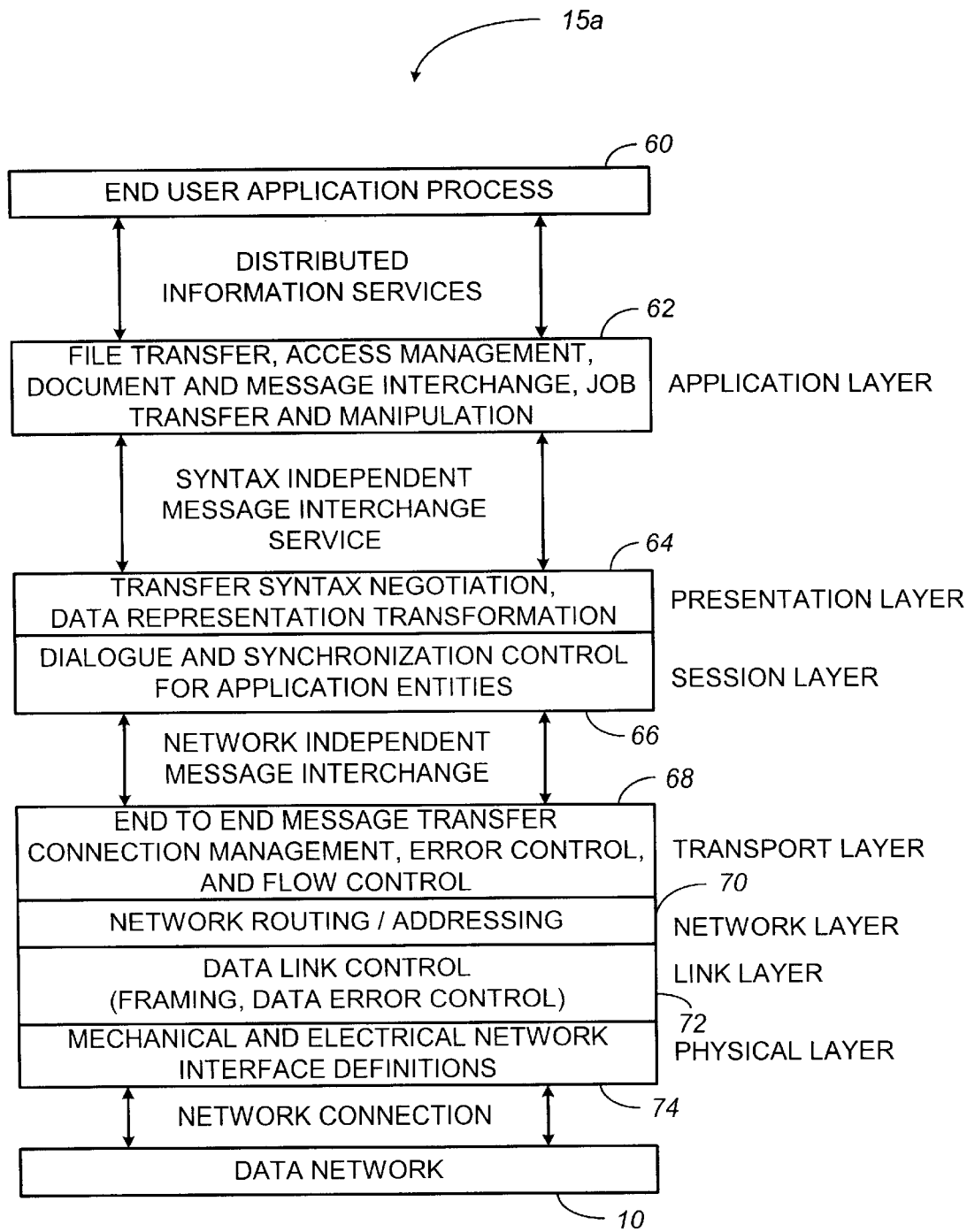
FIG. 4 further illustrates the protocol layers between the data network and computer A illustrated in FIGS. 1 and 3.

Having described the ISO reference model for OSI with regard to FIG. 3, reference is now directed to FIG. 4. In this regard, FIG. 4 further illustrates the functionality imbedded within the seven layers between the first computer 15*a* and the data network 10 introduced in FIGS. 1 and 3.

As illustrated in FIG. 4, the protocol layers within the first computer 15*a* are as follows: the application layer 62, the presentation layer 64, the session layer 66, the transport layer 68, the network layer 70, the link layer 72, and the physical layer 74. The function of each of the seven layers introduced with regard to the reference model for OSI in FIG. 3 is specified formally as a protocol that defines the set of rules and conventions used by each layer to communicate with a peer layer in a remote computer 15*b* (not shown). Each layer provides a set of services to the layer immediately above. It also uses the services provided by the layer immediately below to transport the message units associated with the protocol to the remote peer layer. By way of example, the transport layer 68 provides a network-independent message transport service to the session layer 66 above it and uses the service provided by the network layer 70 below it, to transfer the set of message units associated with the transport protocol to a transport layer 68 located in the second (remote) computer 15*b* (see FIG. 3).

Application-Oriented Layers

The Application Layer

The application layer 62 provides the user interface between an end-user application process 60 (i.e., a computer program) and a range of networking distributed information services as illustrated in FIG. 4. Such services may take the form of file transfer, access, and management, as well as, general document and message interchange services such as electronic mail.

Access to application services is normally achieved through a defined set of primitives, each with associated parameters, which are supported by the local operating system. The access primitives function similarly to other well-known operating system calls and result in an appropriate operating system procedure being activated. These operating system calls use the communication system (software and hardware) as if it were a local device within its own computer, such as a hard disk drive controller. The detailed operation of the communication system below is transparent to the computer user and to the application layer 62 as well. When the application process is performed, one or more parameters are returned indicating the status of the process attempted (success or otherwise). In addition to information transfer, the application layer 62 provides such services as: identification of one or more intended destination devices; determination of the availability of the one or more destination devices; establishment of authority to communicate; agreement on privacy (encryption techniques) mechanisms; authentication of the intended one or more destination devices; selection of a dialogue discipline; agreement on the responsibility for error recovery; and identification on constraints for data syntax. For simplicity of illustration, the aforementioned application layer 62 functions are designated file transfer, access management, document and message interchange, job transfer and manipulation as shown in FIG. 4.

The Presentation Layer

The presentation layer 64 is concerned with the syntax of data during data transfer between communicating end-user application processes 60. To achieve a true OSI, a number of abstract data syntax forms have been defined for use by end-user application processes 60 together with associated transfer syntaxes. The presentation layer 64 negotiates and selects an appropriate transfer syntax to be used during the course of a particular transaction to maintain data integrity between the two end-user application processes 60.

To illustrate the services performed by the presentation layer, consider a telephone conversation between individuals that speak separate and distinct languages. Assume that each speaker uses an interpreter and that the only common language between the interpreters is English. In order to facilitate communication, each interpreter must translate from his or her local language to English and vice versa. The two speakers are analogous to two end-user application processes 60 with the two interpreters representing the presentation layer. Both local syntaxes (the local languages), as well as, a common syntax (English) are used by the parties to communicate. It is important to note that there must be a universally understood language, which must be defined and used by the interpreters in order for the speakers to communicate.

Another function of the presentation layer 64 is concerned with data security. In some applications, data sent by an end-user application process 60 is first encrypted using a key, which is known by the intended recipient of the data. The recipient decrypts any received data using the key before passing the data to the destination end-user application process 60.

The Session Layer

The session layer 66 provides a means to enable two application layer protocol entities to organize and synchronize their dialogue and manage the data exchange. It is thus responsible for setting up and clearing a communication channel between two communicating application layer protocol entities (actually presentation layer protocol entities) as illustrated in FIG. 4.

A number of optional services are provided, including the following: interaction management (duplex/half-duplex); synchronization, for managing data transfers when a data fault is encountered; and exception reporting when an unrecoverable fault is encountered during a data transfer.

Interface Between the Application-Oriented Layers and the Network-Dependent Layers The Transport Layer The transport layer 68 provides an interface between the higher application-oriented layers and the underlying network-dependent layers. It provides the session layer 66 with a message transfer facility that is independent of the underlying network type. By providing the session layer 66 with a defined set of message transfer facilities, the transport layer 68 hides the detailed operation of the network layer 70 from the session layer 66.

The transport layer 68 offers a number of service classes, which cater to the varying Quality of Service (QoS) levels provided by different types of networks. There are five service classes ranging from class 0, which provides only basic functionality required to establish a connection and perform a data transfer, to class 4, which provides full error control and flow control procedures. By way of example, a class 0 data transfer may be selected for use with a packet-switched data network, whereas, a class 4 data transfer may be selected for use with a local area network (LAN).

Network-Dependent Layers

The lowest three layers of the ISO reference model are network dependent, as such their detailed operation varies from one network type to another. However, some generalities can be made as further illustrated in FIG. 4.

The Network Layer

The network layer 70 is responsible for establishing and clearing a network wide connection between to two transport layer protocol entities. It includes such facilities as network routing and addressing and, in some instances, flow control across the computer to network interface. In the case of internetworking, the network layer 70 provides various harmonizing functions between the interconnected networks.

The Link Layer

The link layer 72 builds on the physical connection provided by the particular data network 10 to provide the network layer 70 with a reliable information transfer facility. The link layer 72 is responsible for error detection, and in the event of transmission errors, the retransmission of messages. Two types of service are provided: connectionless service treats each information frame as a self-contained entity that is transferred using a best-try approach; and connection oriented service endeavors to provide an error-free information transfer facility.

The Physical Layer

Finally, the physical layer 74 is concerned with the physical and electrical connections or interfaces between the first computer 15*a* and the data network 10. The physical layer 74 provides the link layer 72 with a means of transmitting a serial bit stream between the communicating computers 15*a*, 15*b* (remote computer B not shown).

Figure 5:
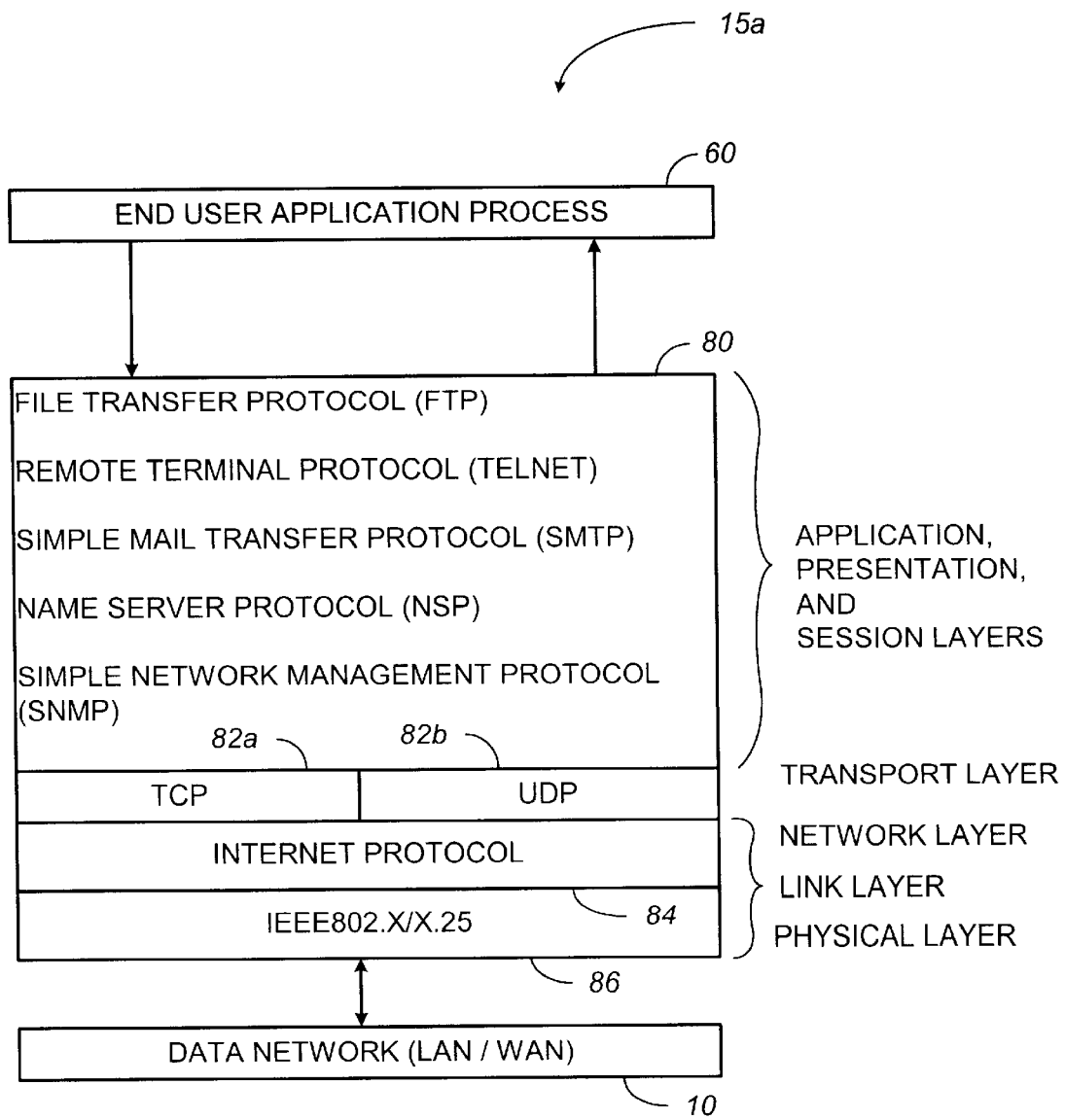
FIG. 5 is a schematic diagram illustrating the relationship between several popular data transmission protocols and the various OSI layers of FIG. 3.

Having described both the ISO reference model for OSI with regard to FIG. 3, and the seven protocol layers of the reference model with regard to FIG. 4, reference is now directed to FIG. 5. In this regard, FIG. 5 is a diagram illustrating the relationship between the seven OSI layers and the currently popular TCP/IP for data transfers between end-user application processes 60 on the Internet and private networks.

The TCP/IP suite may be summarized as illustrated in FIG. 5. As in the OSI reference model previously described with regards to FIGS. 3 and 4, the TCP/IP serves to enable data transfers between an end-user application process 60 operative on a first computer 15*a* and a remotely located computer 15*b* (not shown) coupled to a data network 10 herein further illustrated as either a local area network (LAN) or a wide area network (WAN). It will be appreciated by those skilled in the art that the multi-node ATM switching network 10 of FIG. 1 may be used as the backbone of a WAN. The TCP/IP includes both network-oriented protocols and application support protocols. FIG. 5 shows some of the standard protocols supported along with their relation to the seven protocol layers of the OSI reference model.

As illustrated in FIG. 5, the file transfer protocol (FTP), the remote terminal protocol (TELNET), the simple mail transfer protocol (SMTP), the name server protocol (NSP), and the simple network management protocol (SNMP) are representative protocols provided by the TCP/IP suite 80. As is further illustrated in FIG. 5, the aforementioned protocols relate to the application, presentation and session layers 62, 64, and 66 of the OSI reference model previously described with regards to FIGS. 3 and 4.

As shown in FIG. 5, a TCP 82*a* resides at the transport layer 70 (see FIG. 4) of the ISO reference model along with a user datagram protocol (UDP) 82*b*. As further illustrated in FIG. 5, an Internet protocol (IP) 84 resides below the transport layer 70 and relates to the lowest three levels of the ISO reference model. Below the IP 84 resides a set of joint physical connection standards herein designated as IEEE802.X/X.25 86 that define the physical interconnections for existing switched data networks 10.

It is important to note that since TCP/IP was developed concurrently with the ISO initiative to develop an OSI standard, TCP/IP does not contain specific protocols related to all of the seven OSI reference model layers. Nevertheless, most of the functionality associated with the ISO reference model layers is embedded within the suite of protocols illustrated in FIG. 5.

Figure 6:
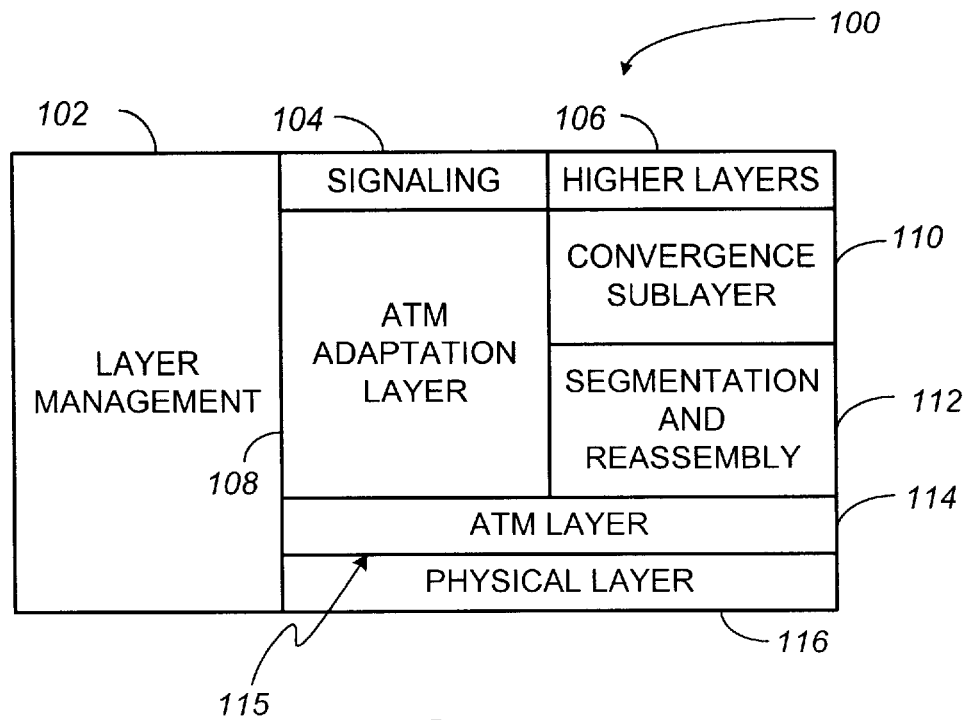
FIG. 6 is a schematic diagram illustrating the broadband integrated services digital network (B-ISDN) protocol reference model as may be applied to the multi-node ATM switching communications system of FIG. 1.

Having described both the relationship between the seven ISO reference model layers with the TCP/IP suite for data transfers between end user application processes 60 on the Internet with regard to FIG. 5, reference is now directed to FIG. 6. FIG. 6 is a diagram illustrating a broadband integrated services digital network (B-ISDN) protocol reference model. A B-ISDN is an all purpose digital network to facilitate worldwide information exchange between any two subscribers without limitations introduced or imposed by either the medium or the data to be transferred. Asynchronous transfer mode (ATM) is the transport mode of choice for B-ISDN. ATM is a connection-oriented packet-switching technique that uses a 53-byte fixed size cell to transfer information via a network. The short packet size of ATM, at high transmission rates, offers the flexibility to provide a wide range of services required by different end-user applications. The term asynchronous indicates that the cells generated by a source may appear at irregular intervals in the network. The connection-oriented nature of ATM arises out of the need to reserve resources in the network to meet the QoS requirements of end-user applications 60 and because the ATM cell header is not self-sufficient (i.e., the ATM cell header is only meaningful on a link by link basis and must be supplemented with local context information at each switching and termination point.

As illustrated in FIG. 6, the B-ISDN protocol reference model 100 comprises layer management 102, a signaling layer 104, higher layers 106, an ATM adaptation layer 108, an ATM layer 114, and a physical layer 116. The ATM adaptation layer 108, as illustrated in FIG. 6, may be further described as comprising both a convergence sublayer and a segmentation and reassembly (SAR) sublayer 112. As also illustrated in FIG. 6, an interface 115 may be present between the ATM layer 114 and the physical layer 116. A well-known interface 115 between the ATM layer 114 and the physical layer 116 is the universal test and operations physical interface for ATM (UTOPIA). The UTOPIA interface 115 is the standard interface defined by the ATM forum between physical layer 116 and ATM layer 114 devices.

The signaling layer 104 and the higher layers 106 illustrated at the uppermost levels in the ATM protocol may be further described as a user layer. Thus the B-ISDN protocol reference model of FIG. 6 can be described as comprising a physical layer 116, an ATM layer 114, an ATM adaptation layer 108, and a user layer (comprising the signaling layer 104 and the higher layers 106). The physical layer 116 transports cells between two ATM entities (i.e., a first computer 15*a* and a remote computer 15*b*). It guarantees, within a certain probability, cell header integrity and merges user cells to generate a continuous bit stream across a physical transport medium. The ATM layer 114 transfers fixed size ATM cells between the users of the ATM layer 114 by preserving the cell sequence integrity. The ATM layer 114 includes the following: cell structure and encoding; message traffic control; services provided to the ATM adaptation layer 108; and services expected from the physical layer 116.

The ATM layer 114 deals with the functions of the cell header independent of the type of information carried in the cell. Thus simplicity and flexibility are achieved by omitting various services required by end-user application processes 60 (see FIGS. 3–5). In particular, the ATM layer 114 does not provide information on the frequency of the service clock, detection of erroneously inserted cells, detection for lost or omitted cells, means to determine and handle cell delay variation (CDV), and awareness of the content of the user information.

The main reason for not providing these services at the ATM layer 114 is that not all end-user application processes 60 (see FIG. 5) require these services. By way of example, data traffic does not require information on the frequency of the service clock, whereas, voice encoded data may require awareness on the contents of the information. Accordingly, the functionality required by various data services are grouped into a small number of classes that are supported by different ATM adaptation layers 108.

There are four service classes, as well as, a user defined class of service. Class A corresponds to services that require a constant bit rate (CBR) connection. Class A services require timing synchronization between the source and the destination nodes. Two examples are 64 kb/s pulse code modulation (PCM) voice and CBR video. Class B corresponds to a variable bit rate (VBR) connection-oriented service. Class B services also require a timing relation between the source and the destination nodes. VBR encoded video is an example of a data service which falls into the B service class. Class C corresponds to VBR connection-oriented service with no timing relation between the source and the destination node. A typical service within the C service class is a connection-oriented data transfer. Class D corresponds to a VBR connectionless service with no timing relation between the source and the destination node. Connectionless data transfer between two LANs over a WAN, such as the Internet, is an example of a class D type service. Class X service is a raw cell service to allow for proprietary vendor-defined ATM adaptation layers 108.

As introduced herein above, the ATM adaptation layer 108 further comprises a convergence sublayer (CS) 110 and a segmentation and reassembly (SAR) sublayer 112. A transmit node SAR sublayer 112 receives CS-protocol data units (CS-PDUs) and segments them, or collects in the case of CBR services, so that when a SAR header/trailer is added to the PDU, the final payload fits into one ATM payload portion of 48 bytes. On the receiving end, the SAR sublayer 112 reconstructs the CS-PDUs from received cells and passes them to the CS sublayer 110. The CS sublayer 110 is further divided into a common portion and a service specific portion (not shown). The common portion of the CS sublayer 110 performs functions common to a particular ATM adaptation layer 108 class of users. The service specific requirements of different classes of users, for example, timing recovery for real-time applications, are implemented in the service specific portion of the CS sublayer 110. For services that do not require any specific function, the service specific portion may be null.

CBR services in the ATM framework are assumed to require a timing relationship between the end nodes. VBR services, on the other hand, are further classified into two subcategories depending upon whether an end-to-end timing relationship is required. The former classification is intended for applications such as VBR video and audio. The latter classification is for data services. These data-service applications may be further classified based on those that require a connection-oriented data transfer and those that transfer data via a connectionless application service.

Figure 7:
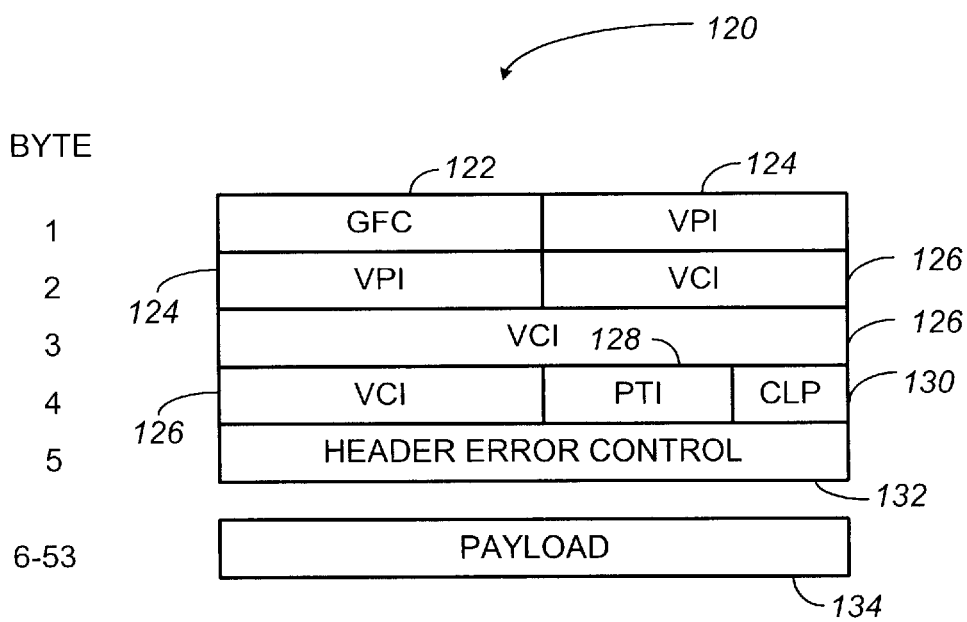
FIG. 7 is a schematic diagram illustrating the cell format of a transmission mode of choice, asynchronous transfer mode (ATM), for cell data transfer in the B-ISDN represented in the protocol reference model of FIG. 6.

Having described the B-ISDN protocol as illustrated in FIG. 6, along with ATM layers and service classes, reference is now directed to FIG. 7. In this regard, FIG. 7 illustrates the ATM cell format at a user network interface (UNI). As illustrated in FIG. 7, an ATM cell 120 comprises 53 bytes, with the first five bytes forming a cell header and the remaining 48 bytes a payload 134. As further illustrated in FIG. 7, the ATM cell header comprises a first byte consisting of two fields, a generic flow control (GFC) field 122 and a virtual path identifier (VPI) 124. The second byte of the ATM cell header also contains two fields, a second portion of the VPI 124 and a first portion of a virtual channel identifier (VCI) field 126. The third byte of the ATM cell header comprises a second portion of the VCI 126. The fourth byte of the ATM cell header comprises a third portion of the VCI 126, a payload type identifier (PTI) field 128, and a cell loss priority (CLP) field 130. The fifth and last byte of the ATM cell header comprises a header error control field 132.

The GFC field 122 is a 4-bit field providing flow control and fairness at a UNI. It is not used to control data traffic in the other direction, that is, network to user traffic flow. The GFC field 122 has no use within the network 10 (see FIG. 1) and was intended for use by access mechanisms that implement different access levels and priorities. The GFC field 122 is mostly unused at this time.

ATM data transfers require established connections prior to initiating and completing a data transfer. ATM uses routing tables at each node 13 (FIG. 1) along the path of a connection that map the connection identifiers from the incoming links to the outgoing links. There are two levels of routing hierarchies, virtual paths (VPs) and virtual channels (VCs). A VC uses a unique identifier used to describe the unidirectional transport of cells from one end user to a remotely located end user (i.e., a first computer 15a and a remote computer 15b). A VP is a collection of one or more VCs between two nodes. Each VP has a bandwidth associated with it limiting the number of VCs that can be multiplexed on the VP. VPIs are used to route packets between two nodes that originate, remove, or terminate the VPs, whereas, VCIs are used at these end nodes 13 (FIG. 1) to distinguish between individual connections. It is significant to note that there is no difference between a VP and a VC when a VP is defined over a single physical link. When a VP is defined over two or more physical links, it reduces the size of the routing tables by allowing a number of VCs to be switched based upon a single identifier, that is, a VPI 124.

The PTI field 128 defines what is transmitted in the cell payload. The CLP field 130 of the ATM cell header is a 1-bit field that provides limited flexibility by defining two cell-loss priorities. The header error control field 132 is used mainly to discard cells with corrupted ATM cell headers and to delineate ATM cells 120. Where cell delineation is the process of determining the cell boundaries from the received bit stream. The 8-bit field provides single-bit error correction and a low probability of corrupted cell delivery capabilities. It is significant to note that single-bit error correction is applicable only if a private messaging domain introduces random bit errors. In fact, error correction may be explicitly forbidden.

A possible end-to-end model for data communications using a xDSL data transfer medium, where xDSL is an acronym designated to encompass the group consisting of but not limited to ADSL, RADSL, integrated services digital network DSL (IDSL), multi-rate symmetric DSL (MSDSL), HDSL, HDSL2, and further including discrete multi-tone heavy (DMT.heavy) and DMT-G.Lite may consist of TCP/IP running on top of PPP, which may run on top of ATM. The QoS and VC flexibility inherent in ATM permits a single user access to many different time sensitive and time insensitive data sources simultaneously. By way of example, a single user may surf the net (time insensitive), download a software application (time/order sensitive), listen to a web radio station (time sensitive), and check corporate electronic mail (time insensitive) by accessing a virtual private network. Ideally, a single user could have multiple open "windows" or active applications each of which may be connected to a separate VC with each of the aforementioned data services received and transmitted via logically separate data streams through the xDSL interface to a remote device.

Figure 8:
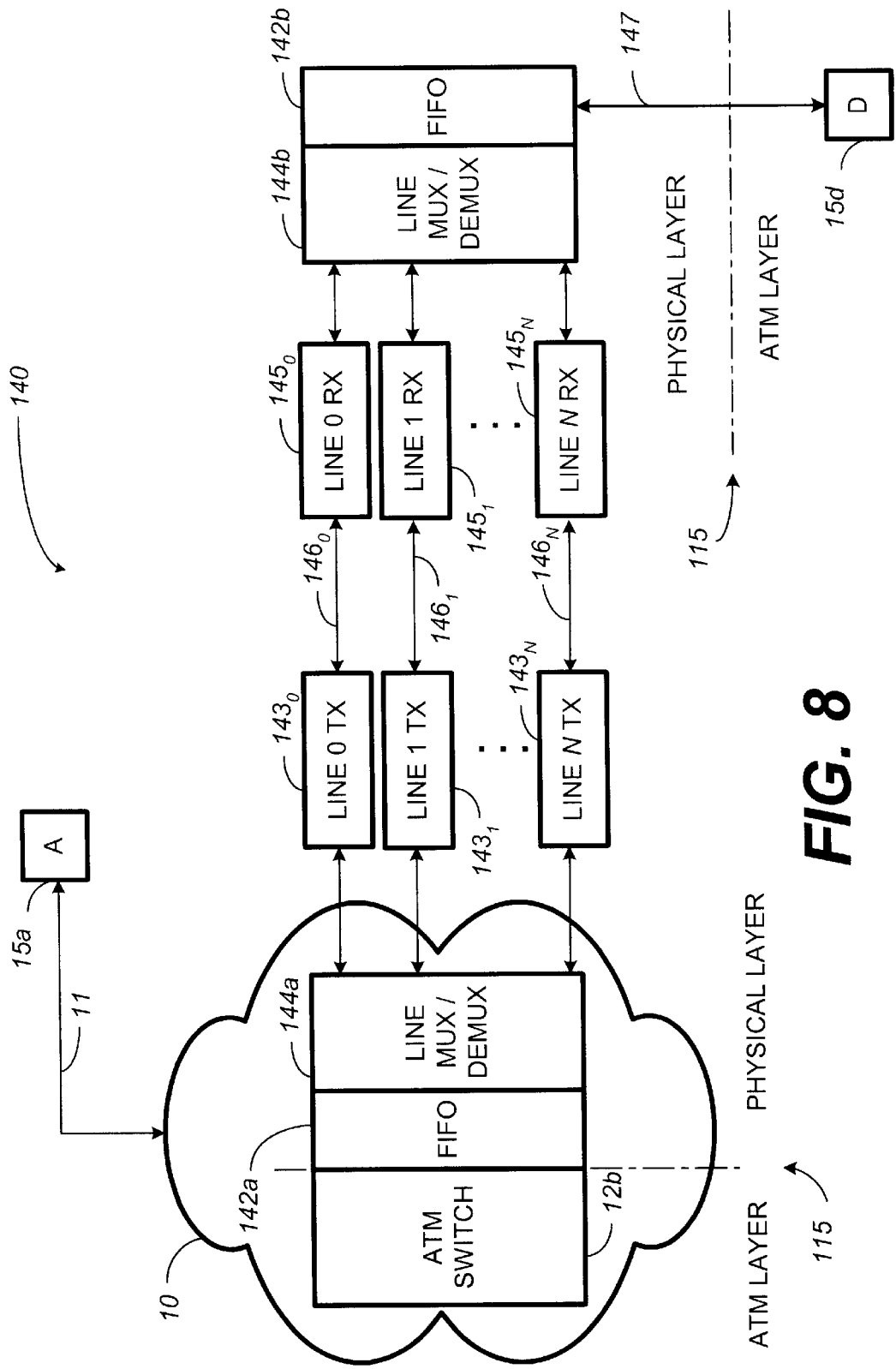
FIG. 8 is a functional block diagram of an exemplary multi-channel communication link in accordance with the present invention.

Turning now to the drawings focusing on illustrating the hardware portion of the present invention, wherein like reference numerals designate corresponding parts throughout the drawings, FIG. 8 is a functional block diagram illustrating a preferred embodiment of a multi-channel communication link 140 in accordance with the present invention.

As illustrated in FIG. 8, a multi-channel communication link 140 in accordance with the present invention may replace a communication link 11 that connects an ATM node 13b with an ATM computing device 15d as introduced in FIG. 1. A multi-channel communication link 140 in accordance with the present invention may comprise a first first-in first-out (FIFO) buffer 142a, a first line multiplexer/demultiplexer (mux/demux) 144a, a plurality of communication line transmitters 143, a plurality of physical communication lines 146, a plurality of designated communication line receivers 145, a second line multiplexer/demultiplexer (mux/demux) 144b, and a second FIFO buffer 142b. It is significant to note that the first and second FIFO buffers 142a, 142b illustrated in FIG. 8 are each representative of two unidirectional FIFOs. In general, there is one unidirectional FIFO per endpoint for a total of four unidirectional FIFOs. As illustrated in FIG. 8, the first FIFO buffer 142a may be communicatively coupled with the ATM switch 12b via an interface 115. The previously introduced UTOPIA interface is an exemplary ATM layer—physical layer interface configured to support bi-directional communications between the ATM layer (e.g., the ATM switch) and physical layer (e.g., the first FIFO buffer 142a) devices. It is significant to note that while the present example is presented from the perspective of a data communications transfer from computing device 1Sa to computing device 15d, a multi-channel communication link 140 in accordance with the present invention is capable of supporting bi-directional communications between the computing devices 15a, 15d.

In a preferred embodiment, the multi-channel communication link 140 applies a sequence number to each individual data packet (e.g., an ATM cell) that traverses the interface 115 between a source ATM layer device and a destination physical layer device. The interface 115 may also be present at other places. As long as the sequence number is inserted at a place where the packet flow has not been multiplexed (split), the sequence number may be used on the receiving end of the multi-channel communication link 140 to ensure correct resequencing of a data stream. The sequence number defines the relative position of the individual data packet in a source data packet stream as it traverses the interface 115. The sequence number may be used in conjunction with a predetermined transport link delay to reassemble a stream of received transport protocol data units at a physical layer device. Either the ATM switch 12b or the first FIFO buffer 142a may be configured to form a transport protocol data unit (TPDU) by inserting a sequence number identifying the relative position of each data packet as it is transported across the time reference point defined by interface 115. Either the ATM switch 12b or the first FIFO buffer 142a may insert an appropriate sequence number if the standard data packet length is redefined to encompass the sequence number.

Next, the first FIFO buffer 142a may be configured to work together with the first line mux/demux 144a to transfer each available TPDU to an available communication line transmitter 143. Those skilled in the art will appreciate that the stream of TPDUs comprising ATM cells and corresponding sequence numbers may be transferred to each of the N available communication line transmitters 143 in accordance with a plurality of bandwidth optimizing algorithms such that each TPDU is fully transmitted across a single physical transport link. It will be further appreciated that the stream of TPDUs may be distributed across the various available physical communication lines 146 with TPDUs being transferred at a greater frequency by the first line mux/demux 144a to physical communication lines 146 capable of supporting a higher bit transfer rate.

By way of example, a first TPDU may be transferred by the combination of the first FIFO 142a and the first line mux/demux 144a to the line 0 transmitter 143$_0$. In accordance with known data transmission protocols, the line 0 transmitter 143$_0$ may encode and modulate the TPDU for transmission across line 0 146$_0$ where it may be received, demodulated, and decoded at the line 0 receiver 145$_0$ to form a duplicate TPDU for further processing by the second line mux/demux 144b. Simultaneously, a second TPDU may be transferred by the first FIFO 142a and the first line mux/demux 144a to the line 1 transmitter 143$_1$ where it may also be encoded and modulated for transmission across line 146$_1$ for receipt by the line 1 receiver 145$_1$. In a preferred embodiment, each line transmitter 143 and line receiver 145 is implemented with a DSL transceiver and each line 146 comprises a twisted pair telephone transmission line.

At the receiving end of the multi-channel communication link 140 the second line mux/demux 144b may be configured to accept each of the received TPDUs as they are made available by each of the line receivers 145. As each of the TPDUs are accepted they may be placed in a resequencing buffer (not shown) configured to arrange each of the received TPDUs in sequence number order. In a preferred embodiment each of the received TPDUs remains in the resequencing buffer until all TPDUs preceding the present TPDU has been received and released. In order to account for the possibility of cell loss, the multi-channel communication link 140 may be configured to monitor the progress of each cell received with a timeout timer. Cells received out of sequence order may be buffered, resequenced, and a timeout timer may be restarted upon the reception of each cell. Once it has been determined that an expected cell has not been received as determined by the lack of a cell in the resequencing buffer with a sequence number match for the next expected sequence number and the timeout period has expired, the multichannel communication link 140 may be configured to release all buffered cells in sequence order up to the cell that generated the timeout. As previously mentioned, this is one choice that insures that the treatment is uniform but with increased delay. The other solution is to release the TPDU as soon as it is available and it is confirmed that all its predecessors have been released. Those skilled in the art will appreciate that the TPDU release or resequencing delay may be set as a function of measured data transfer rate differences between the various communication links or in the alternative, a priori knowledge concerning expected data transmission rates of the corresponding hardware and the distance to be traversed of the various links. It will be further appreciated that the TPDU release delay may be required to permit the transmission and resequencing of one or more TPDUs sent via communications links with varying data transfer rates.

It is significant to note that the TPDU resequencing or sorting operation need not be a general sorting operation since the reception of TPDUs from the original ATM cell stream is not entirely random. As a result, the TPDU resequencing operation may be implemented using constant time primitives (e.g., a calendar queue data structure for the case where the sequence number is small and thus the maximum cardinality of values to sort is small). It is also significant to note that the multi-channel communication link 140 in accordance with the present invention may process data packets but is preferably applied to fixed length data packets, especially ATM cells. It will be appreciated that a component of the TPDU release delay is reduced to zero for the case where the multichannel communication link 140 is transporting fixed length data packets as the timing skew associated with variable packet lengths goes to zero.

As is further illustrated in FIG. 8, once each of the TPDUs reaches maturity (i.e., all its predecessors have been received or the preceding TPDU has been in the multichannel communication link 140 for a time that equals or exceeds the TPDU release timeout period) each of the received TPDUs in the correct sequence order may be communicated to the remote computing device 15d via a suitably configured communications link 147. It will be appreciated that in order to take full advantage of the bandwidth on demand flexibility provided by the multi-channel communication link 140 of the present invention, the communications link 147 used to communicatively couple the computing device 15d to the second FIFO 142b must be able to support the cumulative bandwidth of the N communication lines 146 comprising the physical transport link.

It will be appreciated that in the case where the multi-channel communication link 140 uses a plurality of DSLs to form the virtual transport link, the line transmitters 143 may transfer data between corresponding line receivers 145 using a data stream comprising a serial ATM cell stream, where each ATM cell is inverse multiplexed across the various available DSLs. In the case of missing data or when the DSL data transfer rate is greater than the effective ATM payload rate, ATM idle cells may be inserted to maintain ATM cell synchronization.

Figure 9:
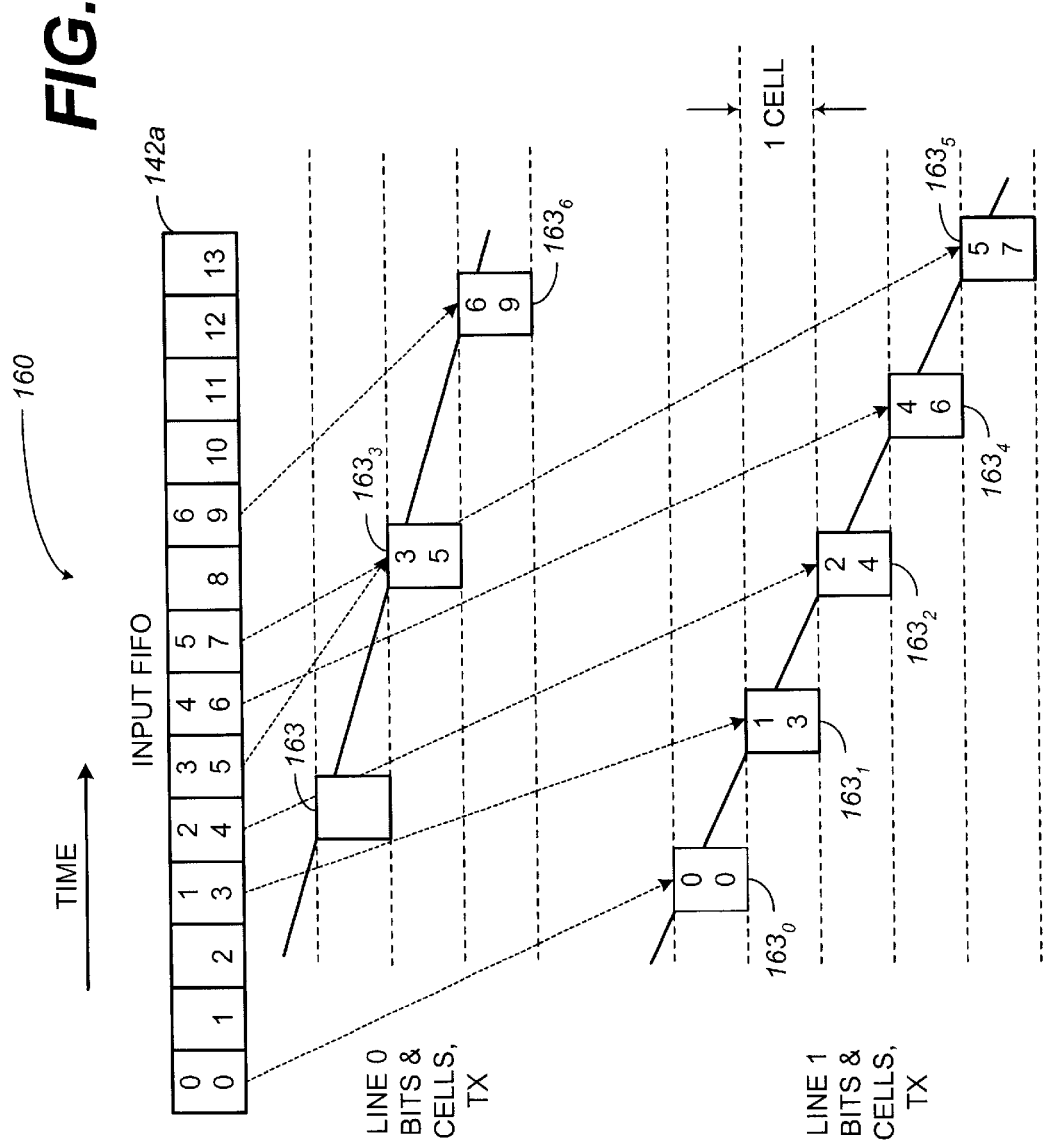
FIG. 9 is an exemplary timing diagram that illustrates the transmission of a plurality of ATM cells across the multi-channel communication link of FIG. 8.

Reference is now directed to FIG. 9, which illustrates a timing diagram generally identified by reference numeral 160 presented to assist in the understanding of the application of sequence numbers at the interface 115 (FIG. 8) between an ATM layer device and a physical transport layer device. In this regard, the transmit timing diagram 160 comprises an exemplary schematic illustrating a seven cell ATM cell sequence that may be stored in FIFO 142a. As illustrated in FIG. 9, the FIFO 142a may contain the seven ATM cells over a time frame that may contain 14 separate ATM cells. Each ATM cell may be identified by a first number representing a sequence number and a second number indicative of the relative time position of the ATM cell in the exemplary 14 time periods. It is significant to note that the ATM cell sequence is not continuous in time as time periods 1, 2, 8, and 10 through 13 suitable for containing ATM cells are devoid of ATM cells.

The transmit timing diagram 160 reveals the relative cell position in time of each of the seven ATM cells as each is inverse multiplexed for transmission over a two-line physical transport link. As illustrated in FIG. 9, ATM cells 3 163$_3$ and 6 163$_6$ may be transmitted along with a "dummy" ATM cell 163 along a first transmission line, herein labeled, "line 0." It is significant to note that the slope of the line connecting the "dummy" cell with ATM cells 3 163$_3$ and 6 163$_6$ is representative of the transmit bit rate that may be expected on line 0. As also illustrated in FIG. 9, ATM cells 0, 1, 2, 4, and 5 163$_0$, 163$_1$, 163$_2$, 163$_4$, and 163$_5$, respectively, may be transmitted along a second transmission line, herein labeled, "line 1." It is further significant to note that slope of the line connecting ATM cells 0 163$_0$, 1 163$_1$, 2 163$_2$, 4 163$_4$, and 5 163$_5$ is representative of the bit transfer rate available on line 1. It is significant to note that FIG. 9, while respecting causality doesn't completely follow the round robin rule. A strict round robin operation would send cell 1 $163_1$ as cell 163 (the first cell on line 0), as cell 1 $163_1$ is ready for transport before the cell transport opportunity on line 0 as represented by the dummy cell 163. By the same token, cell 0 $163_0$ would be transmitted earlier. Both these differences could in fact happen in a real system where cells could be queued in the FIFO before enabling the line themselves (not recommended practice though). A more disturbing difference is that cell 6 $163_6$ on line 0 is sent before cell 5 $163_5$ on line 1, this should normally never happen except in a simplified model, but could happen in a real system with hidden variable delays between the output of the FIFO and transmission via the various lines.

Figure 10:
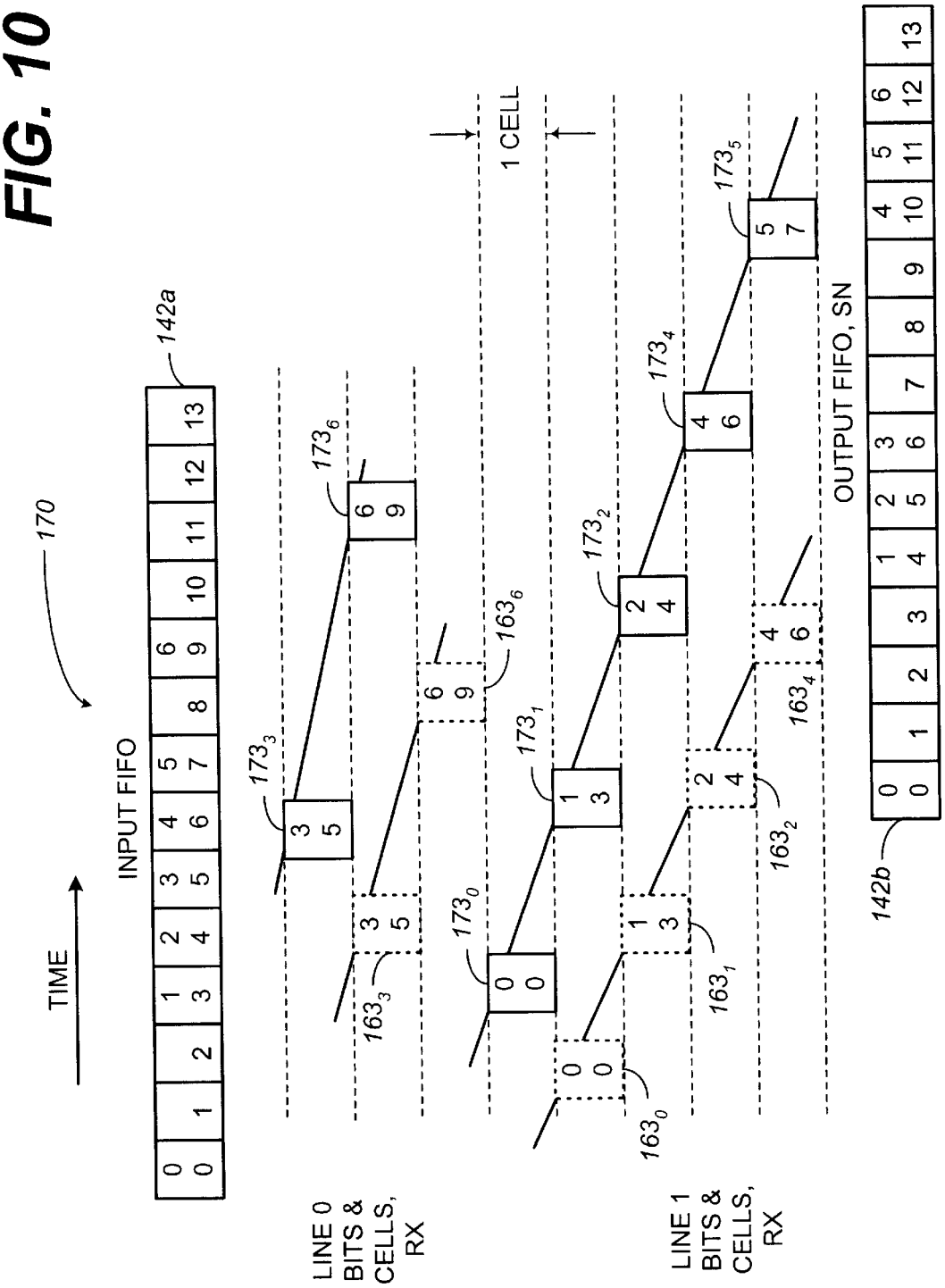
FIG. 10 is an exemplary timing diagram that illustrates the reception and sequential organization of the ATM cells of FIG. 9.

Having briefly described the application of a sample ATM cell stream across a multi-channel communication link 140 with regard to a two-line example of FIG. 9, reference is now directed to FIG. 10. In this regard, FIG. 10 illustrates an exemplary timing diagram generally identified by reference numeral 170 as may be recorded at a receiving line mux/demux 144 (FIG. 8). In this regard, the receive timing diagram 170 comprises an exemplary timing schematic illustrating a seven cell ATM cell sequence that may be transferred from the first FIFO 142a to the second FIFO 142b via the multichannel communication link 140 (FIG. 8). As illustrated in FIG. 10, the FIFO 142a may contain the seven ATM cells as previously introduced in the transmit timing diagram 160 of FIG. 9. It is significant to note that the relative transmit positions (in time) for the ATM cells transferred across lines 0 and 1 (illustrated with dashed lines) have been repeated on FIG. 10 to illustrate possible delays that may be experienced as each of the cells is transferred across the multi-channel communication link 140.

As illustrated in FIG. 10, ATM cells 3 $173_3$ and 6 $173_6$ maybe received along a first transmission line, herein labeled, "line 0." It is significant to note that processing and transmission delays skew the ATM cell availability rate for each of the received cell streams. This is evident from the flatter slope that may be observed across a line formed by ATM cells 3 $173_3$ and 6 $173_6$ (i.e., the received cells) than the slope observed for the transmitted ATM cells 3 $163_3$ and 6 $163_6$. Similarly, processing and transmission delays skew the ATM cell availability rate for ATM cells 0 $173_0$, 1 $173_1$, 2 $173_2$, 4 $1734$, and 5 $173_5$ as received along line 1 when compared with the transmitted ATM cells 0 $163_0$, 1 $163_1$, 2 $163_2$, 4 $163_4$, and 5 $163_5$. As also illustrated in FIG. 9 and in accordance with the present invention, the second FIFO 142b may be supplied the received and line bonded ATM cells 0, 1, 2, 3, 4, 5, and 6 in the correct sequence order. It is significant to note that the multi-channel communication system 140 (FIG. 8) may be implemented to ensure correct resequencing of a variable bandwidth link.

Figure 11:
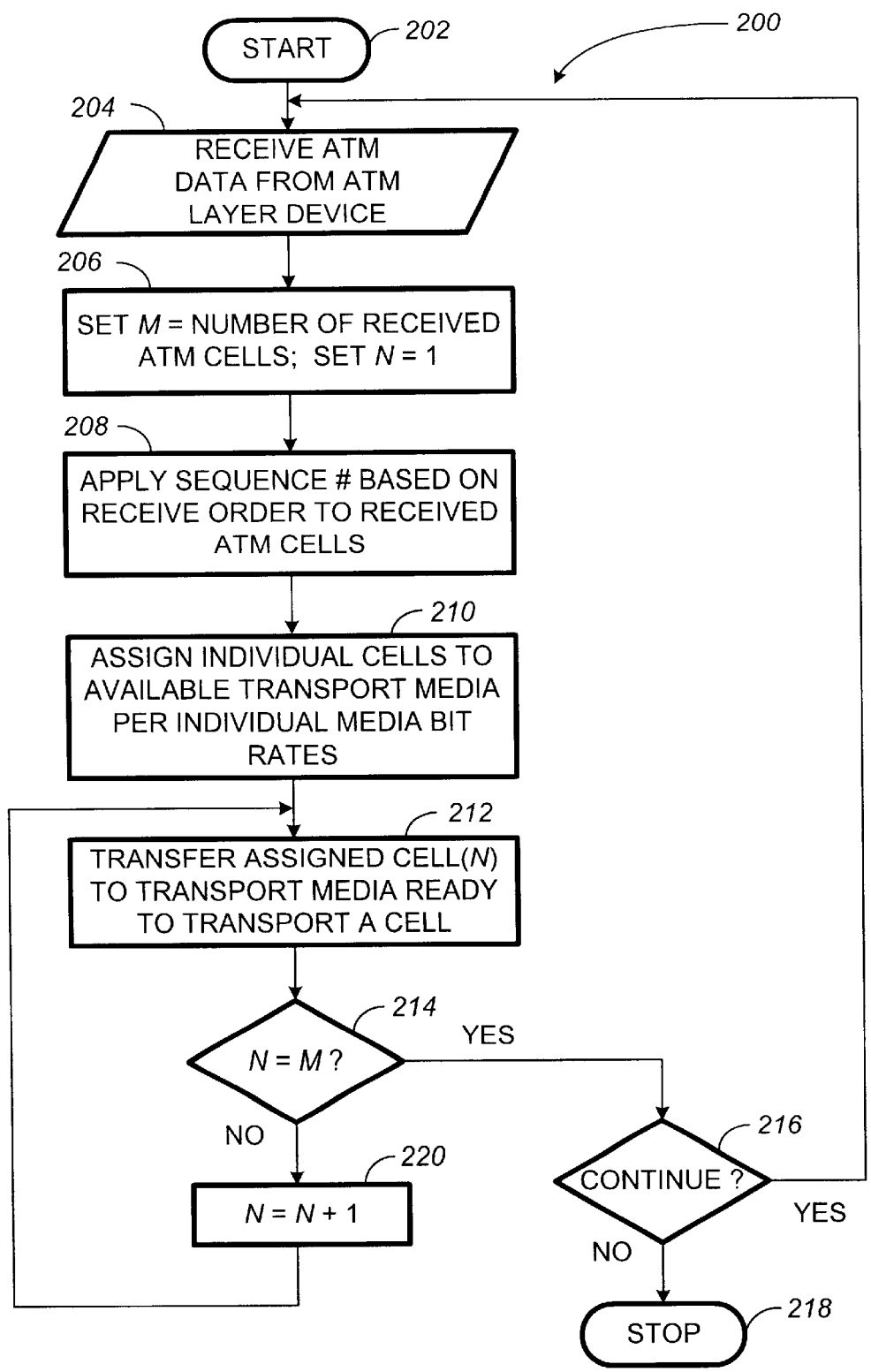
FIG. 11 is a flowchart illustrating a method for transmitting a plurality of ATM cells in a virtual transport network that may be performed by the multi-channel communication link of FIG. 8.

Having briefly described the application of a sample ATM cell stream across a multi-channel communication link 140 with regard to the receive timing diagram of FIG. 10, reference is now directed to FIG. 11. In this regard, FIG. 11 presents a flowchart illustrating a method for transmitting a plurality of ATM cells in a virtual transport network that may be performed by the multi-channel communication link 140 of FIG. 8.

As illustrated in FIG. 11, a method for transmitting a plurality of ATM cells in a virtual transport network 200 may begin with step 202, herein designated as "start." Next, in step 204, the method for transmitting a plurality of ATM cells in a virtual transport link 200 may receive ATM data from an ATM layer device. The method for transmitting a plurality of ATM cells in a virtual transport link 200 may proceed by setting a constant, M, equal to the number of received ATM cells in a time period of interest and initializing an integer variable, N, to 1 as illustrated in step 206. As indicated in step 208, the method for transmitting a plurality of ATM cells in a virtual transport link 200 may apply a sequence number corresponding to the order each of the ATM cells appears at the multi-channels communication link 140 (FIG. 8). Next, in step 210, the method for transmitting a plurality of ATM cells in a virtual transport link 200 may assign individual ATM cells to available transport media in accordance with well known optimization algorithms for inverse multiplexing over a plurality of variable rate transport media. Having identified an appropriate transport medium for each of the cells, the method for transmitting a plurality of ATM cells in a virtual transport link 200 may continue by performing step 212 where ATM cell N is transferred to the appropriate physical transport medium. Next, a check may be performed in step 214 to determine if the entire ATM cell stream has been transferred. If the determination in step 214 is affirmative, a second determination may be performed in step 216 whether to continue receiving ATM cells. If the determination in step 216 is affirmative (i.e., the system is to remain operative) the method may return to step 204 as illustrated in FIG. 11.

Otherwise, if the determination in step 214 is negative (i.e., all received cells have not been transmitted), the method may increment N as shown in step 220 and return to step 212 where the next ATM cell is transferred. If the determination in step 216 is negative, the method may terminate as indicated in step 218.

Figure 12A:
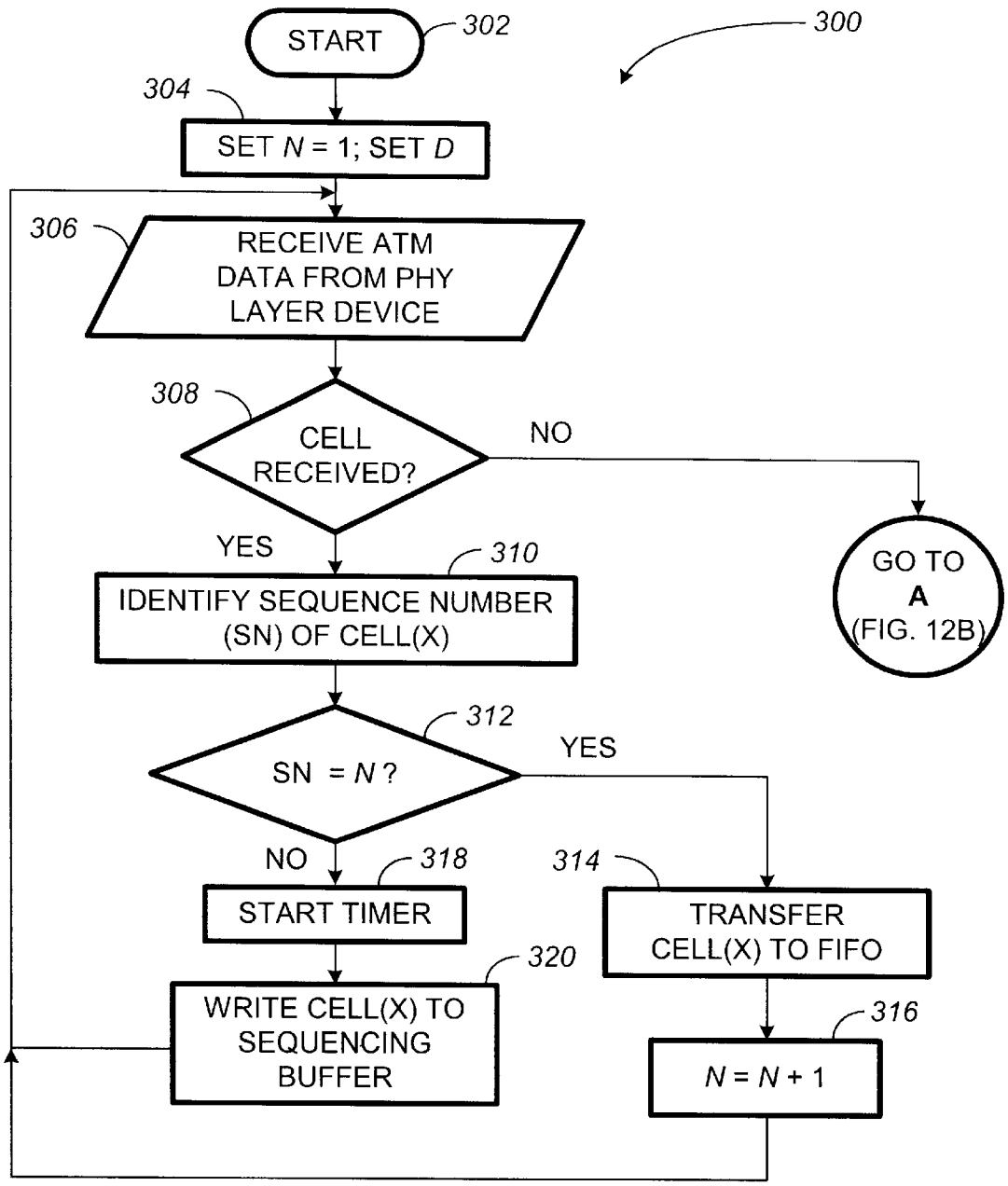
FIGS. 12A and 12B present a flow chart illustrating a preferred method for receiving and resequencing the received ATM cells that may be performed by the multi-channel communication link of FIG. 8.
Figure 12B:
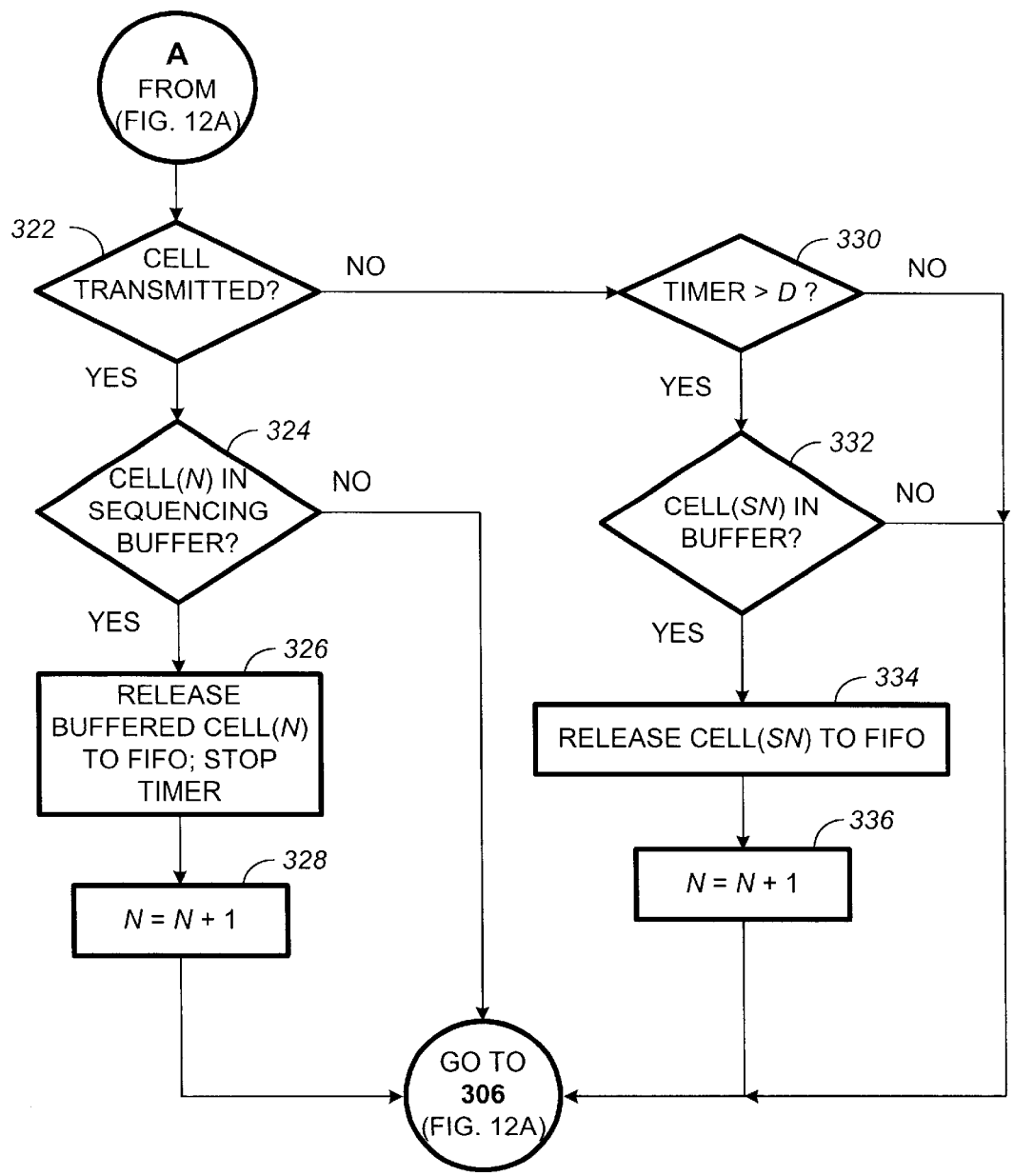

Having briefly described a method for transmitting a plurality of ATM cells in a virtual transport network 200 with regard to the flowchart illustrated in FIG. 11, reference is now directed to FIG. 12, which presents a flowchart illustrating a method for receiving and resequencing received ATM cells that may be performed by the multi-channel communication link of FIG. 8.

As illustrated in FIG. 12, a method for receiving and resequencing received ATM cells 300 may begin with step 302, herein designated as "start." Next, in step 304, the method for receiving and resequencing received ATM cells 300 may set an integer, N, to 1, and a variable, D, indicative of the expected system latency. Having set both N and D, the method for receiving and resequencing received ATM cells 300 may continue by performing step 306 where ATM data cells may be received from a physical layer device. Next, in step 308, the method for receiving and resequencing received ATM cells 300 may make a determination if a complete ATM cell has been received. If the determination in step 308 is negative, the method may be configured to return to step 306 until a complete ATM cell has been received. If the determination in step 308 is affirmative, the method for receiving and resequencing received ATM cells 300 may identify the received ATM cell in step 310 by identifying the sequence number associated with the received ATM cell.

Having identified the current ATM cell the method for receiving and resequencing received ATM cells 300 may make a determination in step 312 if the current cell is the next expected ATM cell based on the previously identified sequence number. If the determination in step 312 is affirmative, the method for receiving and resequencing received ATM cells 300 may transfer the current ATM cell to the second FIFO 142b (FIG. 8) in step 314 where it can be made available for final transfer to the destination computing device 15d (FIG. 8). After transferring the expected ATM cell to the second FIFO 142*b* in step 314, the method for receiving and resequencing received ATM cells 300 may make a determination in step 316 if ATM cells are still arriving. If the determination in step 316 is affirmative, integer N may be incremented as illustrated in step 318 and processing may return to step 306.

Otherwise, if the determination in step 312 is negative (i.e., the current cell is received out of sequence) a timer may be started as illustrated in step 320. Next, a comparison may be performed in step 322 to determine if the previously received cell has been operative in the multi-channel communication system 140 (FIG. 8) for a period of time exceeding the expected system latency. If the determination in step 322 is affirmative, the method for receiving and resequencing received ATM cells 300 may perform step 324 where the method may release the buffered cell(s) to the second FIFO 142(*b*) (FIG. 8) and reset the timer. If the determination in step 322 was negative, the method may perform a wait function as illustrated in step 326 before returning to step 306.

As further illustrated in the flowchart of FIG. 12, after performing step 324 where non-sequential cells are released to the second FIFO 142*b* the method for receiving and resequencing received ATM cells 300 may continue by performing the determination illustrated in step 316. If as illustrated in step 316 it is determined that ATM cells are no longer arriving, the method for receiving and resequencing received ATM cells 300 may terminate as indicated in step 328.

Any process descriptions or blocks in the flow charts of FIGS. 11 and 12 should be understood to represent modules, segments, or portions of code which include one or more executable instructions for implementing specific logical functions or steps in the process. Alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The methods for transmitting and receiving ATM cells as presented in the flowcharts of FIGS. 11 and 12 respectively, may comprise an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc readonly memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It will be appreciated by those skilled in the art that the multi-channel communication link 140 in accordance with the present invention can be implemented in hardware, software, firmware, or a combination thereof In the preferred embodiment(s), the multi-channel communication link 140 is implemented in hardware. As is well known and appreciated by those skilled in the art, the multi-channel communication link 140 can implemented with any or a combination of the following technologies: a discrete logic circuit(s) having logic gates for implementing logic functions upon data signals, an application specific integrated circuit (ASIC) having appropriately configured logic gates, a programmable gate array(s) (PGA), a field programmable gate array (FPGA), etc.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

Therefore, having thus described the invention, at least the following is claimed:

1. A multi-channel communication system, comprising:
    a communication node coupled for data communication over a communications network according to a packet switching data transfer protocol, the communication node configured to receive a stream of data packets in a downstream direction according to a downstream data packet sequence, the communication node further coupled to a plurality of asynchronous communications links, the communication node configured to generate a transport protocol data unit (TPDU) corresponding to each data packet in the received stream, the communication node further configured to inverse multiplex the stream of generated TPDUs for transmission over the plurality of asynchronous communication links;
    a destination line multiplexer/demultiplexer coupled for data communication with the plurality of asynchronous communication links, the destination line multiplexer/demultiplexer configured to receive and resequence the stream of TPDUs in accordance with the downstream data packet sequence, the destination line multiplexer/demultiplexer also configured to release a TPDU once it is in the correct sequence order; and
    a destination first-in first-out (FIFO) buffer with an input coupled to an output of the destination line multiplexer/demultiplexer and an output coupled to a destination computing device.

2. The communication system of claim 1, wherein data transmissions are performed via a frame relay data transfer protocol.

3. The communication system of claim 1, wherein data transmissions are performed via an asynchronous transfer mode (ATM) data transfer protocol.

4. The communication system of claim 1, wherein the plurality of asynchronous communication links comprise digital subscriber lines (DSLs).

5. The communication system of claim 1, wherein the destination line multiplexer/demultiplexer is configured to hold TPDUs that arrive out of sequence order.

6. The communication system of claim 1, wherein the communication node comprises:
    a data packet switch;
    a source line multiplexer/demultiplexer coupled for data communication with the plurality of asynchronous communication links, the source line multiplexer/
demultiplexer configured to receive and resequence an
upstream stream of TPDUs generated in accordance
with an upstream data packet sequence inverse multi-
plexed across the plurality of asynchronous communi-
cation links, the source line multiplexer/demultiplexer
further configured to release an upstream TPDU once it
is in the correct upstream data packet sequence order;
and a source FIFO buffer with an input coupled to an output
of the source line multiplexer/demultiplexer and an
output coupled to the data packet switch.

7. The communication system of claim 3, wherein the communication node comprises an ATM layer device coupled with a physical layer device.

8. The communication system of claim 5, wherein the destination line multiplexer/demultiplexer releases held TPDUs in response to a timeout mechanism responsive to an expected worse case transport delay skew for a data packet that traverses the communication system.

9. The communication system of claim 7, wherein the communication node generates each TPDU in response to the position of the corresponding data packet within the data packet sequence as the corresponding data packet traverses an interface between the ATM layer device and the physical layer device.

10. The communication system of claim 8, wherein the destination line multiplexer/demultiplexer releases held TPDUs in response to a TPDU release delay determined during initialization of the various DSLs comprising the physical transport layer.

11. The communication system of claim 9, wherein each TPDU comprises a data packet and a sequence number.

12. The communication system of claim 10, wherein the TPDU release delay is determined based on expected performance characteristics.

13. A multi-channel communication system, comprising:
means for communicating with at least one network node configured to send the system a downstream data transmission and to receive an upstream data transmission;

means for identifying a data transmission sequence corresponding to each respective downstream and upstream data transmission, accomplished by generating a transport protocol data unit (TPDU) as data packets traverse an interface between an asynchronous transfer mode (ATM) layer device and a physical layer device;

means for distributing a portion of each downstream and upstream data transmission to each of a plurality of asynchronous communication links for transmission to a destination computing device; and means for combining the distributed portions of each downstream and upstream data transmission received from the plurality of asynchronous links wherein the original data transmission sequence is restored.

14. The communication system of claim 13, wherein data transmissions are performed via a data transfer protocol that supports data packet switching.

15. The communication system of claim 13, wherein the plurality of asynchronous communication links comprise digital subscriber lines (DSLs).

16. The communication system of claim 13, wherein the means for combining the distributed portions of each downstream and upstream data transmission comprises a line multiplexer/demultiplexer and a first-in first-out buffer.

17. The communication system of claim 14, wherein data transmissions are performed via a frame relay data transfer protocol.

18. The communication system of claim 14, wherein the data tansfer protocol is an asynchronous transfer mode (ATM) data transfer protocol.

19. The communication system of claim 16, wherein the line multiplexer/demultiplexer is configured to release each data packet received in the correct sequence.

20. The communication system of claim 18, wherein the TPDU comprises an ATM cell with a modified header, the ATM cell header comprising a sequence number responsive to the order in which the ATM cell traversed the interface.

21. The communication system of claim 19, wherein the line multiplexer/demultiplexer is configured to hold each received out of sequence data packet for a predetermined time responsive to a worst case transmission skew between the plurality of asynchronous links of the system.

22. A method for transmitting data to a remote computing device via a virtual transport link, comprising:
applying a sequence number to each data packet of a data stream to be transported to generate a transport protocol data unit (TPDU) in accordance with the relative position of each data packet in the data stream as each data packet traverses an interface between an ATM layer device and a physical transport layer device;

mapping each TPDU to a designated communication line such that a portion of the data stream is designated for transmission by each of a plurality of asynchronous communication lines; and releasing each mapped TPDU to the designated communication line.

23. The method of claim 22, wherein the step of mapping is accomplished with a plurality of asynchronous communication lines comprising digital subscriber lines.

24. The method of claim 22, wherein the step of applying a sequence number is accomplished in an ATM layer device.

25. The method of claim 22, wherein the step of applying a sequence number is accomplished in a physical layer device.

26. A method for receiving data from a remote computing device via a virtual transport link, comprising:
receiving a plurality of inverse multiplexed transport protocol data units (TPDUs) comprising a data packet and a sequence number via a plurality of asynchronous communication lines; and identifying the corresponding sequence number for each received TPDU; releasing the corresponding data packet in the case where the identified sequence number matches an expected sequence counter, otherwise resequencing the corresponding data packets in the case where the identified sequence number fails to match the expected sequence counter.

27. The method of claim 26, wherein the step of
releasing the corresponding data packet is performed after the last preceding TPDU received in the expected sequence order has remained in the system for a predetermined period.

28. The method of claim 26, wherein the step of receiving a plurality of inverse multiplexed TPDUs is accomplished with a plurality of asynchronous communication lines comprising digital subscriber lines.

29. The method of claim 26, wherein the data packets are formulated in accordance with a data transfer protocol.

30. The method of claim 26, wherein the data packets are formulated in accordance with a frame relay data transfer protocol.

31. The method of claim 28, wherein the data transfer protocol comprises an asynchronous transfer mode (ATM) protocol.

32. The method of claim 26, further comprising:
communicating the received and sequence verified data packets to a destination computing device.

* * * * *